(12) United States Patent
Bridges et al.

(10) Patent No.: US 9,164,173 B2
(45) Date of Patent: Oct. 20, 2015

(54) LASER TRACKER THAT USES A FIBER-OPTIC COUPLER AND AN ACHROMATIC LAUNCH TO ALIGN AND COLLIMATE TWO WAVELENGTHS OF LIGHT

(71) Applicant: FARO Technologies, Inc., Lake Mary, FL (US)

(72) Inventors: Robert E. Bridges, Kennett Square, PA (US); Jacob J. Mertz, Glen Mills, PA (US)

(73) Assignee: FARO TECHNOLOGIES, INC., Lake Mary, FL (US)

(*) Notice: Subject to any disclaimer, the term of this patent is extended or adjusted under 35 U.S.C. 154(b) by 0 days.

(21) Appl. No.: 14/562,935

(22) Filed: Dec. 8, 2014

(65) Prior Publication Data

US 2015/0160344 A1    Jun. 11, 2015

Related U.S. Application Data

(63) Continuation-in-part of application No. 13/431,494, filed on Mar. 27, 2012, now Pat. No. 8,908,154.

(60) Provisional application No. 61/592,049, filed on Jan. 30, 2012, provisional application No. 61/475,703, filed on Apr. 15, 2011.

(51) Int. Cl.
*G01C 3/08* (2006.01)
*G01S 17/42* (2006.01)
(Continued)

(52) U.S. Cl.
CPC ............. *G01S 17/42* (2013.01); *G01C 15/002* (2013.01); *G01S 7/4808* (2013.01); *G01S 7/4813* (2013.01); *G01S 7/4818* (2013.01); *G01S 7/491* (2013.01); *G01S 17/66* (2013.01); *G01S 17/89* (2013.01)

(58) Field of Classification Search
CPC ..... G01S 17/42; G01S 7/4808; G01S 7/4813; G01S 17/89; G01C 15/002
See application file for complete search history.

(56) References Cited

U.S. PATENT DOCUMENTS 2,612,994 A   10/1952   Woodland
2,682,804 A    7/1954   Clifford et al.
(Continued)

FOREIGN PATENT DOCUMENTS

CA   2811444 A1   3/2012
CN   1263807 A    8/2000
(Continued)

OTHER PUBLICATIONS

Turk, et al., "Perceptual Interfaces", UCSB Technical Report 2003-33, [Retreived Aug. 11, 2011, http://www.cs.ucsb.edu/research/tech_reports/reports/2003-33.pdf] (2003). p. 1-43.
(Continued)

*Primary Examiner* — Luke Ratcliffe
*Assistant Examiner* — Samantha K Abraham
(74) *Attorney, Agent, or Firm* — Cantor Colburn LLP

(57) ABSTRACT

A coordinate measurement device sends a first beam of light having first and second wavelengths to a target point. The device includes a fiber-optic coupler that combines the first and second wavelengths and launches them through an achromatic optical element to produce collimated and aligned light. The device also includes first and second motors, first and second angle measuring devices, a distance meter, and a processor that determines 3D coordinates of the target point based on the measured distance and two angles.

17 Claims, 24 Drawing Sheets

(51) Int. Cl.

| | | |
|---|---|---|
| G01S 17/66 | (2006.01) | |
| G01S 7/48 | (2006.01) | |
| G01C 15/00 | (2006.01) | |
| G01S 17/89 | (2006.01) | |
| G01S 7/481 | (2006.01) | |
| G01S 7/491 | (2006.01) | |

(56) References Cited

U.S. PATENT DOCUMENTS

| | | |
|---|---|---|
| 2,484,641 A | 3/1957 | Keuffel et al. |
| 2,784,641 A | 3/1957 | Keuffel et al. |
| 3,339,457 A | 9/1967 | Pun |
| 3,365,717 A | 1/1968 | Holscher |
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,178,515 A | 12/1979 | Tarasevich |
| 4,297,030 A | 10/1981 | Chaborski |
| 4,403,857 A | 9/1983 | Holscher |
| 4,413,907 A | 11/1983 | Lane |
| 4,453,825 A | 6/1984 | Buck et al. |
| 4,498,764 A | 2/1985 | Bolkow et al. |
| 4,521,107 A | 6/1985 | Chaborski et al. |
| 4,531,833 A | 7/1985 | Ohtomo |
| 4,537,475 A | 8/1985 | Summers et al. |
| 4,560,270 A | 12/1985 | Wiklund et al. |
| 4,632,547 A | 12/1986 | Kaplan et al. |
| 4,652,130 A | 3/1987 | Tank |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,731,812 A | 3/1988 | Akerberg |
| 4,731,879 A | 3/1988 | Sepp et al. |
| 4,767,257 A | 8/1988 | Kato |
| 4,777,660 A | 10/1988 | Gould et al. |
| 4,790,651 A | 12/1988 | Brown et al. |
| 4,839,507 A | 6/1989 | May |
| 4,983,021 A | 1/1991 | Fergason |
| 5,002,388 A | 3/1991 | Ohishi et al. |
| 5,051,934 A | 9/1991 | Wiklund |
| 5,069,524 A | 12/1991 | Watanabe et al. |
| 5,082,364 A | 1/1992 | Russell |
| 5,090,131 A | 2/1992 | Deer |
| 5,121,242 A | 6/1992 | Kennedy |
| 5,137,354 A | 8/1992 | deVos et al. |
| 5,138,154 A | 8/1992 | Hotelling |
| 5,162,862 A | 11/1992 | Bartram et al. |
| 5,198,868 A | 3/1993 | Saito et al. |
| 5,237,384 A | 8/1993 | Fukunaga et al. |
| 5,263,103 A | 11/1993 | Kosinski |
| 5,267,014 A | 11/1993 | Prenninger |
| 5,301,005 A | 4/1994 | deVos et al. |
| 5,313,409 A | 5/1994 | Wiklund et al. |
| 5,319,434 A | 6/1994 | Croteau et al. |
| 5,347,306 A | 9/1994 | Nitta |
| 5,392,521 A | 2/1995 | Allen |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,440,326 A | 8/1995 | Quinn |
| 5,448,505 A | 9/1995 | Novak |
| 5,455,670 A | 10/1995 | Payne et al. |
| 5,500,737 A | 3/1996 | Donaldson et al. |
| 5,532,816 A | 7/1996 | Spann et al. |
| 5,534,992 A | 7/1996 | Takeshima et al. |
| 5,594,169 A | 1/1997 | Field et al. |
| D378,751 S | 4/1997 | Smith |
| 5,671,160 A | 9/1997 | Julian |
| 5,698,784 A | 12/1997 | Hotelling et al. |
| 5,724,264 A | 3/1998 | Rosenberg et al. |
| 5,737,068 A | 4/1998 | Kaneko et al. |
| 5,742,379 A | 4/1998 | Reifer |
| 5,754,284 A | 5/1998 | Leblanc et al. |
| RE35,816 E | 6/1998 | Schulz |
| 5,764,360 A | 6/1998 | Meier |
| 5,767,952 A | 6/1998 | Ohtomo et al. |
| 5,771,623 A | 6/1998 | Pernstich et al. |
| 5,825,350 A | 10/1998 | Case, Jr. et al. |
| 5,828,057 A | 10/1998 | Hertzman et al. |
| 5,861,956 A | 1/1999 | Bridges et al. |
| 5,880,822 A | 3/1999 | Kubo |
| 5,886,775 A | 3/1999 | Houser et al. |
| 5,886,777 A | 3/1999 | Hirunuma |
| 5,892,575 A | 4/1999 | Marino |
| 5,893,214 A | 4/1999 | Meier et al. |
| 5,898,421 A | 4/1999 | Quinn |
| 5,926,388 A | 7/1999 | Kimbrough et al. |
| 5,930,030 A | 7/1999 | Scifres |
| 5,957,559 A | 9/1999 | Rueb et al. |
| 5,973,788 A | 10/1999 | Pettersen et al. |
| 5,991,011 A | 11/1999 | Damm |
| 6,017,125 A | 1/2000 | Vann |
| 6,023,326 A | 2/2000 | Katayama et al. |
| 6,034,722 A | 3/2000 | Viney et al. |
| 6,036,319 A | 3/2000 | Rueb et al. |
| 6,052,190 A | 4/2000 | Sekowski et al. |
| D427,087 S | 6/2000 | Kaneko et al. |
| 6,085,155 A | 7/2000 | Hayase et al. |
| 6,097,491 A | 8/2000 | Hartrumpf |
| 6,097,897 A | 8/2000 | Ide |
| 6,100,540 A | 8/2000 | Ducharme et al. |
| 6,111,563 A | 8/2000 | Hines |
| 6,122,058 A | 9/2000 | Van Der Werf et al. |
| 6,133,998 A | 10/2000 | Monz et al. |
| 6,166,809 A | 12/2000 | Pettersen et al. |
| 6,171,018 B1 | 1/2001 | Ohtomo et al. |
| 6,193,371 B1 | 2/2001 | Snook |
| 6,222,465 B1 | 4/2001 | Kumar et al. |
| 6,262,801 B1 | 7/2001 | Shibuya et al. |
| 6,295,174 B1 | 9/2001 | Ishinabe et al. |
| 6,317,954 B1 | 11/2001 | Cunningham et al. |
| 6,324,024 B1 | 11/2001 | Shirai et al. |
| 6,330,379 B1 | 12/2001 | Hendriksen |
| 6,344,846 B1 | 2/2002 | Hines |
| 6,347,290 B1 | 2/2002 | Bartlett |
| 6,351,483 B1 | 2/2002 | Chen |
| 6,353,764 B1 | 3/2002 | Imagawa et al. |
| 6,369,794 B1 | 4/2002 | Sakurai et al. |
| 6,369,880 B1 | 4/2002 | Steinlechner |
| 6,433,866 B1 | 8/2002 | Nichols |
| 6,437,859 B1 | 8/2002 | Ohtomo et al. |
| 6,445,446 B1 | 9/2002 | Kumagai et al. |
| 6,462,810 B1 | 10/2002 | Muraoka et al. |
| 6,463,393 B1 | 10/2002 | Giger |
| 6,490,027 B1 | 12/2002 | Rajchel et al. |
| 6,532,060 B1 | 3/2003 | Kindaichi et al. |
| 6,559,931 B2 | 5/2003 | Kawamura et al. |
| 6,563,569 B2 | 5/2003 | Osawa et al. |
| 6,567,101 B1 | 5/2003 | Thomas |
| 6,573,883 B1 | 6/2003 | Bartlett |
| 6,573,981 B2 | 6/2003 | Kumagai et al. |
| 6,583,862 B1 | 6/2003 | Perger |
| 6,587,244 B1 | 7/2003 | Ishinabe et al. |
| 6,611,617 B1 | 8/2003 | Crampton |
| 6,624,916 B1 | 9/2003 | Green et al. |
| 6,633,367 B2 | 10/2003 | Gogolla |
| 6,646,732 B2 | 11/2003 | Ohtomo et al. |
| 6,650,222 B2 | 11/2003 | Darr |
| 6,667,798 B1 | 12/2003 | Markendorf et al. |

(56) References Cited

U.S. PATENT DOCUMENTS

| | | |
|---|---|---|
| 6,668,466 B1 | 12/2003 | Bieg et al. |
| 6,678,059 B2 | 1/2004 | Cho et al. |
| 6,681,031 B2 | 1/2004 | Cohen et al. |
| 6,727,984 B2 | 4/2004 | Becht |
| 6,727,985 B2 | 4/2004 | Giger |
| 6,754,370 B1 | 6/2004 | Hall-Holt et al. |
| 6,765,653 B2 | 7/2004 | Shirai et al. |
| 6,802,133 B2 | 10/2004 | Jordil et al. |
| 6,847,436 B2 | 1/2005 | Bridges |
| 6,859,744 B2 | 2/2005 | Giger |
| 6,864,966 B2 | 3/2005 | Giger |
| 6,935,036 B2 | 8/2005 | Raab |
| 6,957,493 B2 | 10/2005 | Kumagai et al. |
| 6,964,113 B2 | 11/2005 | Bridges et al. |
| 6,965,843 B2 | 11/2005 | Raab et al. |
| 6,980,881 B2 | 12/2005 | Greenwood et al. |
| 6,996,912 B2 | 2/2006 | Raab |
| 6,996,914 B1 | 2/2006 | Istre et al. |
| 7,022,971 B2 | 4/2006 | Ura et al. |
| 7,023,531 B2 | 4/2006 | Gogolla et al. |
| 7,055,253 B2 | 6/2006 | Kaneko |
| 7,072,032 B2 | 7/2006 | Kumagai et al. |
| 7,086,169 B1 | 8/2006 | Bayham et al. |
| 7,095,490 B2 | 8/2006 | Ohtomo et al. |
| 7,099,000 B2 | 8/2006 | Connolly |
| 7,129,927 B2 | 10/2006 | Mattsson |
| 7,130,035 B2 | 10/2006 | Ohtomo et al. |
| 7,168,174 B2 | 1/2007 | Piekutowski |
| 7,177,014 B2 | 2/2007 | Mori et al. |
| 7,193,695 B2 | 3/2007 | Sugiura |
| 7,196,776 B2 | 3/2007 | Ohtomo et al. |
| 7,222,021 B2 | 5/2007 | Ootomo et al. |
| 7,224,444 B2 | 5/2007 | Stierle et al. |
| 7,230,689 B2 | 6/2007 | Lau |
| 7,233,316 B2 | 6/2007 | Smith et al. |
| 7,246,030 B2 | 7/2007 | Raab et al. |
| 7,248,374 B2 | 7/2007 | Bridges |
| 7,253,891 B2 | 8/2007 | Toker et al. |
| 7,256,899 B1 | 8/2007 | Faul et al. |
| 7,262,863 B2 | 8/2007 | Schmidt et al. |
| 7,274,802 B2 | 9/2007 | Kumagai et al. |
| 7,285,793 B2 | 10/2007 | Husted |
| 7,286,246 B2 | 10/2007 | Yoshida |
| 7,304,729 B2 | 12/2007 | Yasutomi et al. |
| 7,307,710 B2 | 12/2007 | Gatsios et al. |
| 7,312,862 B2 | 12/2007 | Zumbrunn et al. |
| 7,321,420 B2 | 1/2008 | Yasutomi et al. |
| 7,325,326 B1 | 2/2008 | Istre et al. |
| 7,327,446 B2 | 2/2008 | Cramer et al. |
| 7,336,346 B2 | 2/2008 | Aoki et al. |
| 7,336,375 B1 | 2/2008 | Faul et al. |
| 7,339,655 B2 | 3/2008 | Nakamura et al. |
| 7,345,748 B2 | 3/2008 | Sugiura et al. |
| 7,352,446 B2 | 4/2008 | Bridges et al. |
| 7,372,558 B2 | 5/2008 | Kaufman et al. |
| 7,388,654 B2 | 6/2008 | Raab et al. |
| 7,388,658 B2 | 6/2008 | Glimm |
| 7,401,783 B2 | 7/2008 | Pryor |
| 7,423,742 B2 | 9/2008 | Gatsios et al. |
| 7,446,863 B2 | 11/2008 | Nishita et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,503,123 B2 | 3/2009 | Matsuo et al. |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,541,965 B2 | 6/2009 | Ouchi et al. |
| 7,552,539 B2 | 6/2009 | Piekutowski |
| 7,555,766 B2 | 6/2009 | Kondo et al. |
| 7,562,459 B2 | 7/2009 | Fourquin et al. |
| 7,564,538 B2 | 7/2009 | Sakimura et al. |
| 7,565,216 B2 | 7/2009 | Soucy |
| 7,583,375 B2 | 9/2009 | Cramer et al. |
| 7,586,586 B2 | 9/2009 | Constantikes |
| 7,613,501 B2 | 11/2009 | Scherch |
| 7,614,019 B2 | 11/2009 | Rimas Ribikauskas et al. |
| D605,959 S | 12/2009 | Apotheloz |
| 7,634,374 B2 | 12/2009 | Chouinard et al. |
| 7,634,381 B2 | 12/2009 | Westermark et al. |
| 7,692,628 B2 | 4/2010 | Smith et al. |
| 7,701,559 B2 | 4/2010 | Bridges et al. |
| 7,701,566 B2 | 4/2010 | Kumagai et al. |
| 7,705,830 B2 | 4/2010 | Westerman et al. |
| 7,710,396 B2 | 5/2010 | Smith et al. |
| 7,724,380 B2 | 5/2010 | Horita et al. |
| 7,728,963 B2 | 6/2010 | Kirschner |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,765,084 B2 | 7/2010 | Westermark et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,894,079 B1 | 2/2011 | Altendorf et al. |
| 7,903,237 B1 | 3/2011 | Li |
| 7,929,150 B1 | 4/2011 | Schweiger |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,125,629 B2 | 2/2012 | Dold et al. |
| 8,151,477 B2 | 4/2012 | Tait |
| 8,190,030 B2 | 5/2012 | Leclair et al. |
| 8,217,893 B2 | 7/2012 | Quinn et al. |
| 8,237,934 B1 | 8/2012 | Cooke et al. |
| 8,279,430 B2 | 10/2012 | Dold et al. |
| 8,314,939 B2 | 11/2012 | Kato |
| 8,320,708 B2 | 11/2012 | Kurzweil et al. |
| 8,360,240 B2 | 1/2013 | Kallabis |
| 8,379,224 B1 | 2/2013 | Piasse et al. |
| 8,387,961 B2 | 3/2013 | Im |
| 8,405,604 B2 | 3/2013 | Pryor et al. |
| 8,422,034 B2 | 4/2013 | Steffensen et al. |
| 8,437,011 B2 | 5/2013 | Steffensen et al. |
| 8,438,747 B2 | 5/2013 | Ferrari |
| 8,467,072 B2 | 6/2013 | Cramer et al. |
| 8,483,512 B2 | 7/2013 | Moeller |
| 8,509,949 B2 | 8/2013 | Bordyn et al. |
| 8,537,375 B2 | 9/2013 | Steffensen et al. |
| 8,553,212 B2 | 10/2013 | Jaeger et al. |
| 8,654,354 B2 | 2/2014 | Steffensen et al. |
| 8,659,749 B2 | 2/2014 | Bridges |
| 8,670,114 B2 | 3/2014 | Bridges et al. |
| 8,681,317 B2 | 3/2014 | Moser et al. |
| 8,699,756 B2 | 4/2014 | Jensen |
| 8,717,545 B2 | 5/2014 | Sebastian et al. |
| 8,772,719 B2 | 7/2014 | Böckem |
| 8,931,183 B2 | 1/2015 | Jonas |
| 2001/0045534 A1 | 11/2001 | Kimura |
| 2002/0093646 A1 | 7/2002 | Muraoka |
| 2002/0148133 A1 | 10/2002 | Bridges et al. |
| 2002/0179866 A1 | 12/2002 | Hoeller et al. |
| 2003/0014212 A1 | 1/2003 | Ralston et al. |
| 2003/0020895 A1 | 1/2003 | Bridges |
| 2003/0033041 A1 | 2/2003 | Richey |
| 2003/0048459 A1 | 3/2003 | Gooch |
| 2003/0066202 A1 | 4/2003 | Eaton |
| 2003/0090682 A1 | 5/2003 | Gooch et al. |
| 2003/0112449 A1 | 6/2003 | Tu et al. |
| 2003/0133092 A1 | 7/2003 | Rogers |
| 2003/0179362 A1 | 9/2003 | Osawa et al. |
| 2003/0206285 A1 | 11/2003 | Lau |

(56) References Cited

U.S. PATENT DOCUMENTS

| | | |
|---|---|---|
| 2004/0041996 A1 | 3/2004 | Abe |
| 2004/0075823 A1 | 4/2004 | Lewis et al. |
| 2004/0170363 A1 | 9/2004 | Angela |
| 2004/0189944 A1 | 9/2004 | Kaufman et al. |
| 2004/0223139 A1 | 11/2004 | Vogel |
| 2005/0147477 A1 | 7/2005 | Clark |
| 2005/0179890 A1 | 8/2005 | Cramer et al. |
| 2005/0185182 A1 | 8/2005 | Raab et al. |
| 2005/0197145 A1 | 9/2005 | Chae et al. |
| 2005/0254043 A1 | 11/2005 | Chiba |
| 2005/0284937 A1 | 12/2005 | Xi et al. |
| 2006/0009929 A1 | 1/2006 | Boyette et al. |
| 2006/0053647 A1 | 3/2006 | Raab et al. |
| 2006/0055662 A1 | 3/2006 | Rimas-Ribikauskas et al. |
| 2006/0055685 A1 | 3/2006 | Rimas-Ribikauskas et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0140473 A1 | 6/2006 | Brooksby et al. |
| 2006/0141435 A1 | 6/2006 | Chiang |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/0164384 A1 | 7/2006 | Smith et al. |
| 2006/0164385 A1 | 7/2006 | Smith et al. |
| 2006/0164386 A1 | 7/2006 | Smith et al. |
| 2006/0222237 A1 | 10/2006 | Du et al. |
| 2006/0222314 A1 | 10/2006 | Zumbrunn et al. |
| 2006/0235611 A1 | 10/2006 | Deaton et al. |
| 2006/0262001 A1 | 11/2006 | Ouchi et al. |
| 2006/0279246 A1 | 12/2006 | Hashimoto et al. |
| 2007/0016386 A1 | 1/2007 | Husted |
| 2007/0019212 A1 | 1/2007 | Gatsios et al. |
| 2007/0024842 A1 | 2/2007 | Nishizawa et al. |
| 2007/0090309 A1 | 4/2007 | Hu et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0236452 A1 | 10/2007 | Venkatesh et al. |
| 2007/0247615 A1 | 10/2007 | Bridges et al. |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0107305 A1 | 5/2008 | Vanderkooy et al. |
| 2008/0122786 A1 | 5/2008 | Pryor et al. |
| 2008/0203299 A1 | 8/2008 | Kozuma et al. |
| 2008/0229592 A1 | 9/2008 | Hinderling et al. |
| 2008/0239281 A1 | 10/2008 | Bridges |
| 2008/0246974 A1 | 10/2008 | Wilson et al. |
| 2008/0250659 A1 | 10/2008 | Bellerose et al. |
| 2008/0297808 A1 | 12/2008 | Riza et al. |
| 2008/0302200 A1 | 12/2008 | Tobey |
| 2008/0309949 A1 | 12/2008 | Rueb |
| 2008/0316497 A1 | 12/2008 | Taketomi et al. |
| 2008/0316503 A1 | 12/2008 | Smarsh et al. |
| 2009/0009747 A1 | 1/2009 | Wolf et al. |
| 2009/0033621 A1 | 2/2009 | Quinn et al. |
| 2009/0046271 A1 | 2/2009 | Constantikes |
| 2009/0066932 A1 | 3/2009 | Bridges et al. |
| 2009/0109426 A1 | 4/2009 | Cramer et al. |
| 2009/0153817 A1 | 6/2009 | Kawakubo |
| 2009/0157226 A1 | 6/2009 | de Smet |
| 2009/0171618 A1 | 7/2009 | Kumagai et al. |
| 2009/0187373 A1 | 7/2009 | Atwell et al. |
| 2009/0190125 A1 | 7/2009 | Foster et al. |
| 2009/0205088 A1 | 8/2009 | Crampton et al. |
| 2009/0213073 A1 | 8/2009 | Obermeyer et al. |
| 2009/0239581 A1 | 9/2009 | Lee |
| 2009/0240372 A1 | 9/2009 | Bordyn et al. |
| 2009/0240461 A1 | 9/2009 | Makino et al. |
| 2009/0240462 A1 | 9/2009 | Lee |
| 2010/0008543 A1 | 1/2010 | Yamada et al. |
| 2010/0025746 A1 | 2/2010 | Chapman et al. |
| 2010/0058252 A1 | 3/2010 | Ko |
| 2010/0091112 A1 | 4/2010 | Veeser et al. |
| 2010/0103431 A1 | 4/2010 | Demopoulos |
| 2010/0128259 A1 | 5/2010 | Bridges et al. |
| 2010/0142798 A1 | 6/2010 | Weston et al. |
| 2010/0149518 A1 | 6/2010 | Nordenfelt et al. |
| 2010/0149525 A1 | 6/2010 | Lau |
| 2010/0158361 A1 | 6/2010 | Grafinger et al. |
| 2010/0176270 A1 | 7/2010 | Lau et al. |
| 2010/0207938 A1 | 8/2010 | Yau et al. |
| 2010/0225746 A1 | 9/2010 | Shpunt et al. |
| 2010/0234094 A1 | 9/2010 | Gagner et al. |
| 2010/0235786 A1 | 9/2010 | Maizels et al. |
| 2010/0245851 A1 | 9/2010 | Teodorescu |
| 2010/0250175 A1 | 9/2010 | Briggs et al. |
| 2010/0265316 A1 | 10/2010 | Sali et al. |
| 2010/0277747 A1 | 11/2010 | Rueb et al. |
| 2010/0284082 A1 | 11/2010 | Shpunt et al. |
| 2011/0003507 A1 | 1/2011 | Van Swearingen et al. |
| 2011/0007154 A1 | 1/2011 | Vogel et al. |
| 2011/0023578 A1 | 2/2011 | Grasser |
| 2011/0025827 A1 | 2/2011 | Shpunt et al. |
| 2011/0032509 A1 | 2/2011 | Bridges et al. |
| 2011/0035952 A1 | 2/2011 | Roithmeier |
| 2011/0043620 A1 | 2/2011 | Svanholm et al. |
| 2011/0043808 A1 | 2/2011 | Isozaki et al. |
| 2011/0052006 A1 | 3/2011 | Gurman et al. |
| 2011/0069322 A1 | 3/2011 | Hoffer, Jr. |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0109502 A1 | 5/2011 | Sullivan |
| 2011/0112786 A1 | 5/2011 | Desforges et al. |
| 2011/0123097 A1 | 5/2011 | Van Coppenolle et al. |
| 2011/0166824 A1 | 7/2011 | Haisty et al. |
| 2011/0169924 A1 | 7/2011 | Haisty et al. |
| 2011/0173827 A1 | 7/2011 | Bailey et al. |
| 2011/0175745 A1 | 7/2011 | Atwell et al. |
| 2011/0179281 A1 | 7/2011 | Chevallier-Mames et al. |
| 2011/0181872 A1 | 7/2011 | Dold et al. |
| 2011/0260033 A1 | 10/2011 | Steffensen et al. |
| 2011/0301902 A1 | 12/2011 | Panagas et al. |
| 2012/0050255 A1 | 3/2012 | Thomas et al. |
| 2012/0062706 A1 | 3/2012 | Keshavmurthy et al. |
| 2012/0099117 A1 | 4/2012 | Hanchett et al. |
| 2012/0105821 A1 | 5/2012 | Moser et al. |
| 2012/0120391 A1 | 5/2012 | Dold et al. |
| 2012/0120415 A1 | 5/2012 | Steffensen et al. |
| 2012/0154577 A1 | 6/2012 | Yoshikawa et al. |
| 2012/0188559 A1 | 7/2012 | Becker et al. |
| 2012/0206808 A1 | 8/2012 | Brown et al. |
| 2012/0218563 A1 | 8/2012 | Spruck et al. |
| 2012/0262550 A1 | 10/2012 | Bridges |
| 2012/0262573 A1 | 10/2012 | Bridges et al. |
| 2012/0262728 A1 | 10/2012 | Bridges et al. |
| 2012/0265479 A1 | 10/2012 | Bridges et al. |
| 2012/0317826 A1 | 12/2012 | Jonas |
| 2013/0096873 A1 | 4/2013 | Rosengaus et al. |
| 2013/0100282 A1 | 4/2013 | Siercks et al. |
| 2013/0155386 A1 | 6/2013 | Bridges et al. |
| 2013/0162469 A1 | 6/2013 | Zogg et al. |
| 2014/0002806 A1 | 1/2014 | Buchel et al. |
| 2014/0028805 A1 | 1/2014 | Tohme et al. |

FOREIGN PATENT DOCUMENTS

| | | |
|---|---|---|
| CN | 1290850 A | 4/2001 |
| CN | 1362692 A | 8/2002 |
| CN | 1531659 A | 9/2004 |
| CN | 101031817 A | 9/2007 |
| CN | 101203730 A | 6/2008 |
| CN | 101297176 A | 10/2008 |
| CN | 101427155 A | 5/2009 |
| CN | 201548192 U | 8/2010 |
| DE | 7704949 U1 | 6/1977 |
| DE | 3530922 A1 | 4/1986 |
| DE | 3827458 A1 | 2/1990 |
| DE | 10160090 A1 | 7/2002 |
| DE | 202004004945 U1 | 10/2004 |

(56) References Cited

FOREIGN PATENT DOCUMENTS

| | | |
|---|---|---|
| DE | 102004024171 A1 | 9/2005 |
| DE | 102005019058 A1 | 12/2005 |
| DE | 102006013185 A1 | 9/2007 |
| DE | 202006020299 U1 | 5/2008 |
| DE | 60319016 T2 | 4/2009 |
| DE | 102007058692 A1 | 6/2009 |
| EP | 0166106 A1 | 1/1986 |
| EP | 598523 A1 | 5/1994 |
| EP | 0797076 A2 | 9/1997 |
| EP | 0919831 A2 | 6/1999 |
| EP | 0957336 A2 | 11/1999 |
| EP | 1067363 A2 | 1/2001 |
| EP | 1519141 A2 | 3/2005 |
| EP | 1607767 A1 | 12/2005 |
| EP | 2136178 A1 | 12/2009 |
| EP | 2177868 A2 | 4/2010 |
| EP | 2219011 A1 | 8/2010 |
| EP | 2259010 A1 | 12/2010 |
| EP | 2259013 A1 | 12/2010 |
| EP | 2446300 A1 | 5/2012 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | S57147800 | 9/1982 |
| JP | S5804881 | 1/1983 |
| JP | S5848881 A | 3/1983 |
| JP | S6097288 A | 5/1985 |
| JP | 2184788 A1 | 7/1990 |
| JP | H0331715 A | 2/1991 |
| JP | H0371116 A | 3/1991 |
| JP | H0465631 A | 3/1992 |
| JP | H05257005 A | 10/1993 |
| JP | H05302976 A | 11/1993 |
| JP | H6097288 | 4/1994 |
| JP | H06265355 A | 9/1994 |
| JP | H074967 A | 1/1995 |
| JP | H08145679 A | 6/1996 |
| JP | H0914965 A | 1/1997 |
| JP | H102722 A | 1/1998 |
| JP | H10107357 A | 4/1998 |
| JP | H10317874 A | 12/1998 |
| JP | 11502629 A | 3/1999 |
| JP | H11513495 | 11/1999 |
| JP | H11337642 | 12/1999 |
| JP | 2000503476 A | 3/2000 |
| JP | 2000275042 A | 10/2000 |
| JP | 2000346645 A | 12/2000 |
| JP | 2001165662 A | 6/2001 |
| JP | 2001272468 A | 10/2001 |
| JP | 2001284317 A | 10/2001 |
| JP | 2001353112 A | 12/2001 |
| JP | 2002089184 A | 3/2002 |
| JP | 2002098762 A | 4/2002 |
| JP | 2002209361 A | 7/2002 |
| JP | 2004508954 A | 3/2004 |
| JP | 2004108939 A | 4/2004 |
| JP | 2004527751 A | 9/2004 |
| JP | 3109969 U | 6/2005 |
| JP | 2005265700 A | 9/2005 |
| JP | 2006084460 A | 3/2006 |
| JP | 2006276012 A | 10/2006 |
| JP | 2007504459 A | 3/2007 |
| JP | 2007165331 A | 6/2007 |
| JP | 2007523357 A | 8/2007 |
| JP | 2007256872 A | 10/2007 |
| JP | 2008514967 A | 5/2008 |
| JP | 2008544215 A | 12/2008 |
| JP | 2009014639 A | 1/2009 |
| JP | 2011158371 A | 8/2011 |
| JP | 2013525787 A | 10/2011 |
| JP | 2012509464 A | 4/2012 |
| JP | 2012530909 A | 12/2012 |
| JP | 5302976 B2 | 10/2013 |
| WO | 9534849 A1 | 12/1995 |
| WO | 0177613 A1 | 10/2001 |
| WO | 0223121 A1 | 3/2002 |
| WO | 0237466 A1 | 5/2002 |
| WO | 02084327 A2 | 10/2002 |
| WO | 03062744 A1 | 7/2003 |
| WO | 03073121 A1 | 9/2003 |
| WO | 2004063668 A2 | 7/2004 |
| WO | 2005026772 A2 | 3/2005 |
| WO | 2006039682 A1 | 4/2006 |
| WO | 2006052259 A1 | 5/2006 |
| WO | 2006055770 A2 | 5/2006 |
| WO | 2006133799 A1 | 12/2006 |
| WO | 2007079601 A1 | 7/2007 |
| WO | 2007084209 A3 | 7/2007 |
| WO | 2007124010 A2 | 11/2007 |
| WO | 2008052348 A1 | 5/2008 |
| WO | 2008119073 A2 | 10/2008 |
| WO | 2010057169 A2 | 5/2010 |
| WO | 2010100043 A1 | 9/2010 |
| WO | 2010141120 A2 | 12/2010 |
| WO | 2010148525 A1 | 12/2010 |
| WO | 2011035290 A4 | 3/2011 |
| WO | 2011057130 A2 | 5/2011 |
| WO | 2011107729 A1 | 9/2011 |
| WO | 2011112277 A1 | 9/2011 |
| WO | 2010148526 A1 | 12/2012 |

OTHER PUBLICATIONS

Stone, et al. "Automated Part Tracking on the Construction Job Site"; XP 55055816A; National Institute of Standards and Technology. 8 pgs.

Super-Nyquist Operation of the AD9912 Yields a High RF Output Signal; Analog Devices, Inc., AN-939 Application Note; www.analog.com; Copyright 2007; 4 Pages.

Tracker3; Ultra-Portable Laser Tracking System; 2010 Automated Precision Inc.; www.apisensor.com; 4 Pages.

English translation of Japanese Office Action for Application No. 2014-505160 with a draft date of Jun. 12, 2015 and issue date of Jun. 16, 2015 (3 pages.).

Chen Jihua et al, Research on the Principle of 5/6-DOF Laser Tracking Metrology, Journal of Astronautic Metrology and Measurement vol. 27, No. 3, May 31, 2007, pp. 58-62.

Examination Report dated May 5, 2015; DE Application No. 11 2012 001 709.9 filed Apr. 11, 2012; Dated Jan. 15, 2015; Received Jun. 2, 2015; Machine Translation; 4 pages.

James H. Burge et al, Use of a commerical laser tracker for optical alignment, Proc, of SPIE vol. 6676, Sep. 21, 2007, pp. 66760E-1-6 6760E-12.

"A New Generation of Total Stations from Leica Geosystems." K. Zeiske. Leica Geosystems AG, May 1999, 8 pages.

"Fiber Optic Rotary Joints Product Guide"; Moog Inc; MS1071, rev. 2; Retrieved on Nov. 13, 2013 from http://www.moog.com/literature/ICD/Moog-Fiber-Optic-Rotary-Joint_Catalog-en.pdf; p. 1-4.

"Technical Brief: Fiber Optic Rotary Joint"; Document No. 303; Moog Inc; Retrieved on Nov. 13, 2013 from http://www.moog.com/literature/MCG/FORJtechbrief.pdf. p. 1-6.

2×2 High Speed Lithium Niobate Interferometric Switch; [on-line]; JDS Uniphase Corporation; 2007; Retreived from www.jdsu.com; 18 pages.

AO Modulator—M040-8J-FxS; [online—technical data sheet]; Gooch & Housego; Nov. 2006; Retrieved from http://www.goochandhousego.com/ 4 pages.

Automated Precision, Inc., Product Specifications, Radian, Featuring INNOVO Technology, info@apisensor.com, Copyright 2011, 2 pages.

Cao, et al.; "VisionWand: Interaction Techniques for Large Displays using a Passive Wand Tracked in 3D"; Proceedings of the 16th Annual ACM Symposium on User Interface Software and Technology, UIST; vol. 5, issue 2; pp. 173-182; Jan. 2003.

Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131.

(56) References Cited

OTHER PUBLICATIONS

Computer Giants Embrace On-Chip Optics; Mar. 27, 2008; [on-line]; Optics.org; [Retreived on Apr. 2, 2008]; Retreived from http://optics.org/cws/article/research/33521; 2 pages.
Cuypers, et al "Optical Measurement Techniques for Mobile and Large-Scale Dimensional Metrology" (2009) ; Optics and Lasers in Engineering pp. 292-300; vol. 47; Elsevier Ltd. XP 25914917A.
Sladek, J., et al: "The Hybrid Contact-Optical Coordinate Measuring System." Measurement, vol. 44, No. 3, March 1, 2011, pp. 503-510.
RS Series Remote Controlled Optical Switch; [on-line technical data sheet]; Sercalo Microtechnology, Ltd. [Retreived Oct. 14, 2010]; Retreived from http://www.sercalo.com/document/PDFs/DataSheets/RS%20datasheet.pdf; 49 pages.
EOSpace—High-Speed Switches; [on-line technical brochure]; [Retrieved May 18, 2009]; Retrieved from http://www.cospace.com/Switches.htm; 2 pages.
FARO Laser Tracker ION; 2 pages; revised Apr. 23, 2010; FARO Technologies, Inc., www.lasertracker.faro.com.
FARO Technical Institute, Basic Measurement Training Workbook, Version 1.0, FARO Laser Tracker, Jan. 2008, Students Book, FAO CAM2 Measure. 20 pages.
Geng, Jason; "DLP-Based Structured Light 3D Imaging Technologies and Applications"; Proceedings of SPIE, vol. 7932. Published Feb. 11, 2011, 15 pages.
Hanwei Xiong et al: "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.
Hecht,Photonic Frontiers:Gesture Recognition: Lasers Bring Gesture Recognition to the Home, Laser Focus World, pp. 1-5, Retreived on Mar. 3, 2011:http://www.optoiq.com/optoiq-2/en-us/index/photonics-technologies-applications/lfw-display/lfw-display/lfw-arti.
Hui, Elliot E., et al, "Single-Step Assembly of Complex 3-D Microstructures", Jan. 23, 2000, IEEE; pp. 602-607.
Integrated Optical Amplitude Modulator; [on-line technical data sheet]; [RetrievedOct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open; 2 pages.
International Search Report and Written Opinion for International Application No. PCT/US2009/064759, International Filing Date Nov. 17, 2009; 8 pages.
Katowski "Optical 3-D Measurement Techniques-Applications in inspection, quality control and robotic" Vienna, Austria, Sep. 18-20, 1989; 11 pages.
Kester, Walt, Practical Analog Design Techniques, Analog Devices, Section 5, Undersampling Applications, Copyright 1995, pp. 5-1 to 5-34.
Kollorz et al.,"Gesture recognition with a time-of-flight camera",Int. Jo. of Intelligent Sys Tech and Applications,vol. 5, No. 3/4,p. 334-343,Retreived Aug. 11, 2011;http://www5.informatik.uni-erlangen.de/Forschung/Publikationen/2008/Kollorz08-GRW.pdf, 2008.
LaserTRACER-measureing sub-micron in space; http://www.etalon-ag.com/index.php/en/products/lasertracer; 4 pages; Jun. 28, 2011; ETALON AG.
Leica Absolute Tracker AT401 Powerlock, Dec. 18, 2014; 3 pages.
Leica Absolute Tracker AT401-ASME B89.4.19-2006 Specifications; Hexagon Metrology; Leica Geosystems Metrology Products, Switzerland; 2 pages; www.leica-geosystems.com/metrology.
Leica Geosystems AG ED—"Leica Laser Tracker System", Internet Citation, Jun. 28, 2012, XP002678836, Retrieved from the Internet: URL:http://www.a-solution.com.au/pages/downloads/LTD500_Brochure_EN.pdf; 12 pages.
Leica Geosystems Metrology, "Leica Absolute Tracker AT401, White Paper," Hexagon AB; 2010; 16 pages.

Leica Geosystems: "TPS1100 Professional Series", 1999, Retrieved from the Internet: URL:http://www.estig.ibeja.pt/-legvm/top_civil/TPS1100%20-%20A%20New%20Generation%20of%20Total%20Stations.pdf, [Retrieved on Jul. 2012] the whole document; 8 pages.
Li, et al., "Real Time Hand Gesture Recognition using a Range Camera", Australasian Conference on Robotics and Automation (ACRA), [Retreived Aug. 10, 2011, http://www.araa.asn.au/acra/acra2009/papers/pap128s1.pdf] pp. 1-7 (2009).
Lightvision—High Speed Variable Optical Attenuators (VOA); [on-line]; A publication of Lightwaves 2020, Feb. 1, 2008; Retrieved from http://www.lightwaves2020.com/home/; 8 pages.
Maekynen, A. J. et al., Tracking Laser Radar for 3-D Shape Measurements of Large Industrial Objects Based on Time-of-Flight Laser Rangefinding and Position-Sensitive Detection Techniques, IEEE Transactions on Instrumentation and Measurement, vol. 43, No. 1. Feb. 1994; p. 40-48.
Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptical.ws.html; 3 pages.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8.
MEMS Variable Optical Attenuators Single/Multi-Channel; [on-line]; Jan. 17, 2005; Retrieved from www.ozoptics.com; 3 pages.
Nanona High Speed & Low Loss Optical Switch; [on-line technical data sheet]; [Retrieved Oct. 14, 2010]; Retrieved from http://www.bostonati.com/products/PI-FOS.pdf; 2 pages.
New River Kinematics, SA ARM—"The Ultimate Measurement Software for Arms, Software Release!", SA Sep. 30, 2010, [On-line], http://www.kinematics.com/news/software-release-sa20100930.html (1 of 14), [Retrieved Apr. 13, 2011 11:40:47 AM]. 14 pages.
Optical Circulator (3-Ports & 4-Ports); [on-line technical data sheet]; Alliance Fiber Optic Products, Inc. REV.D Jan. 15, 2004; Retrieved from www.afop.com. 2 pages.
Optical Circulators Improve Bidirectional Fiber Systems; by Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirectional-fiber-systems.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517; 6 pages.
Parker, et al "Instrument for Setting Radio Telescope Surfaces" XP 55055817A; 4 pgs.
PCMM System Specifications Leica Absolute Tracker and Leica T-Products; Hexagon Metrology; Leica Geosystems Metrology Products, Switzerland; 8 pages; www.leica-geosystems.com/metrology; 8 pages.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2002. p. S356-S363.
Poujouly, Stephane, et al., Digital Laser Range Finder: Phase-Shift Estimation by Undersampling Technique; IEEE, Copyright 1999; p. 1312-1317.
Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Nov. 2010. 23 pages.

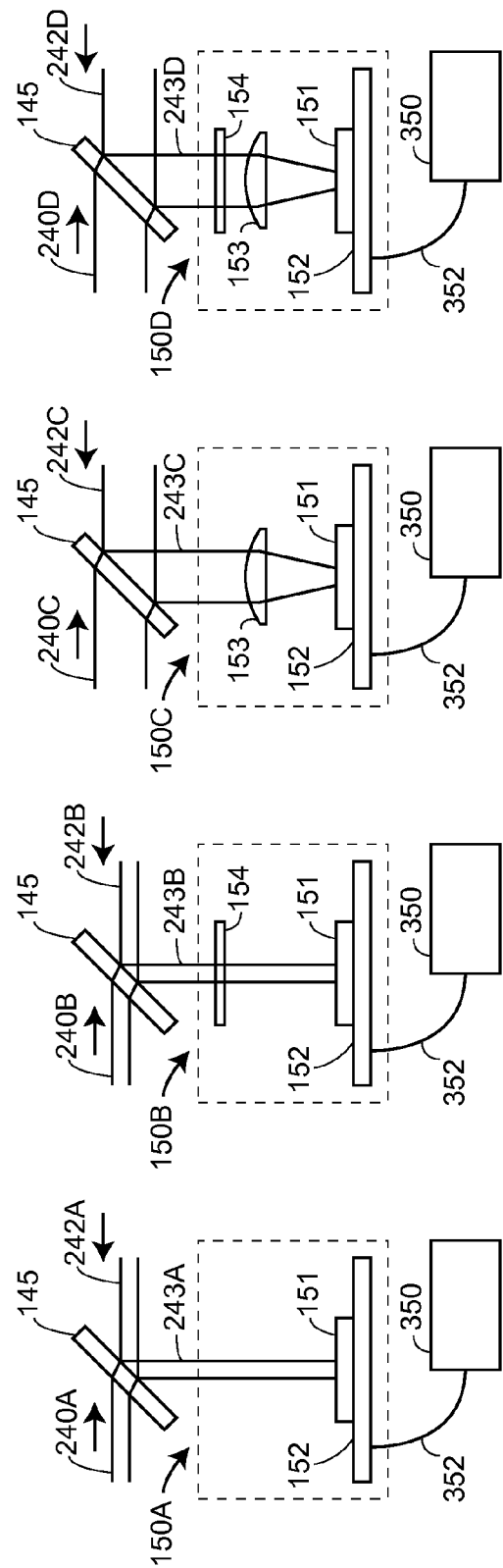

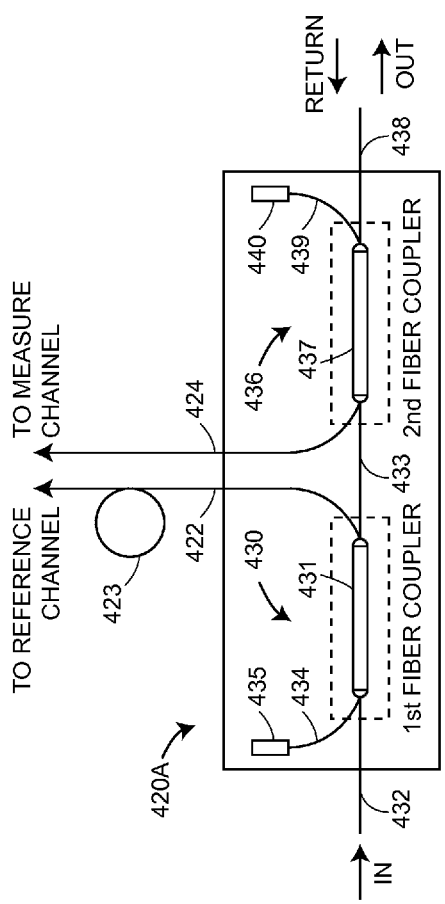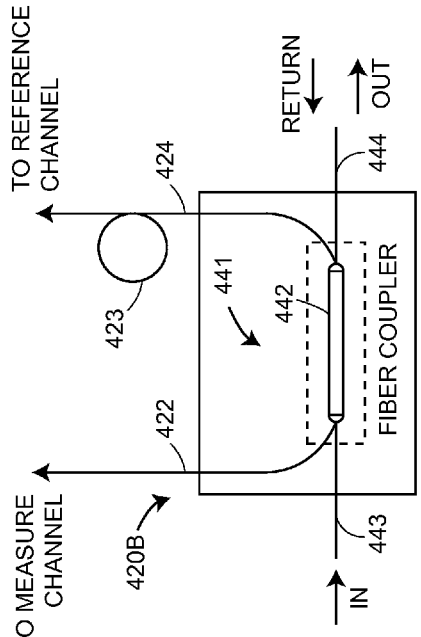

TOP VIEW

SECTION A-A

SECTION B-B

LASER TRACKER THAT USES A FIBER-OPTIC COUPLER AND AN ACHROMATIC LAUNCH TO ALIGN AND COLLIMATE TWO WAVELENGTHS OF LIGHT

CROSS REFERENCE TO RELATED APPLICATIONS

The present application claims the benefit of U.S. patent application Ser. No. 13/431,494, filed Mar. 27, 2012, which claims the benefit of U.S. Provisional Patent Application No. 61/592,049 filed Jan. 30, 2012, and U.S. Provisional Application No. 61/475,703 filed Apr. 15, 2011, the entire contents of all of which are herein incorporated by reference.

BACKGROUND

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Coordinate-measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., the contents of which are herein incorporated by reference, and U.S. Published Patent Application No. 2010/0128259 to Bridges et al., the contents of which are herein incorporated by reference.

In the past, laser trackers that have absolute distance meters have used more than one wavelength. A visible light beam has been used for at least two purposes—(1) providing a beam that lands on a position detector to enable tracking of a retroreflector target, and (2) providing a pointer beam by which a user may determine the pointing direction of the tracker laser beam. An infrared light beam has been used for an absolute distance meter. Such laser beams vary in wavelength from 780 nm to 1550 nm. Difficulties that arise from the use of two different wavelengths include (1) difficulty in obtaining precise alignment of the two different laser beams in traveling from the tracker to the retroreflector, (2) added expense resulting from the need to have two laser sources, extra beam splitters, and other components, and (3) larger required size of the laser beam because of the more rapid spreading of infrared wavelength beam of light compared to that of a visible beam of light. Because of the requirement to align the two different beams of light, additional production steps have been required, thereby increasing production costs. Furthermore, performance of the tracker has never been quite as good as it could have been if the alignment were perfect. The larger required beam size has also meant that beams were clipped by retroreflector targets, thereby resulting in decreasing accuracy in some cases and losing beams in other cases.

Another requirement of beams of light having multiple wavelengths is that optics may not properly collimate each of the wavelengths. This is particularly true if the optical configuration prevents each of the wavelengths from having its own optics to optimize collimation of the light launched out of the tracker. What is needed is a laser tracker capable of launching multiple beams of light being mutually aligned and collimated at a minimum of expense and complexity.

SUMMARY

According to an embodiment of the present invention, a coordinate measurement device is configured to send a first beam of light to a target point, the target point having a position in space, the target point returning a portion of the first beam as a second beam, the measurement device including: a first light source configured to emit a first light having a first wavelength; a second light source configured to emit a second light having a second wavelength, the second wavelength different than the first wavelength; a fiber-optic coupler that includes at least a first port, a second port, and a third port, the first port configured to accept a first portion of the first light, the second port configured to accept a second portion of the second light, the third port configured to transmit a third light, the third light including a portion of the first portion and a portion of the second portion; an optical system configured to transmit a portion of the third light out of the coordinate measurement device as the first beam, the optical system including an achromatic optical element configured to collimate the first beam at the first wavelength and the second wavelength; a first motor and a second motor that together are configured to direct the first beam of light to a first direction, the first direction determined by a first angle of rotation about a first axis and a second angle of rotation about a second axis, the first angle of rotation produced by the first motor and the second angle of rotation produced by the second motor; a first angle measuring device configured to measure the first angle of rotation and a second angle measuring device configured to measure the second angle of rotation; a distance meter configured to measure a first distance from the coordinate measurement device to the target point based at least in part on a third portion of the second beam received by a first optical detector; and a processor configured to provide three-dimensional coordinates of the target point, the three-dimensional coordinates based at least in part on the first distance, the first angle of rotation, and the second angle of rotation.

According to another embodiment of the present invention, a method is provided for measuring three-dimensional coordinates of a target point located at a position in space, the method including steps of: providing a coordinate measurement device that includes a first light source that produces a first light at a first wavelength, a second light source that produces a second light at a second wavelength different than the first wavelength, a fiber-optic coupler that includes at least a first port, a second port, and a third port, an optical system that includes an optical element achromatic at the first wavelength and the second wavelength, a first motor, a second motor, a first angle measuring device, a second angle measuring device, a distance meter, and a processor; coupling a first portion of the first light into the first port; coupling a second portion of the second light into the second port; transmitting a third light from the third port, the third light containing a portion of the first portion and a portion of the second portion; transmitting a portion of the third light through the optical system out of the coordinate measurement device as a first beam of light collimated at the first wavelength and the second wavelength; directing the first beam of light in a first direction, the first direction determined by a first angle of rotation about a first axis and a second angle of rotation about a second axis, the first angle of rotation produced by the first motor and the second angle of rotation produced by the second motor; measuring the first angle of rotation with the first angle measuring device; measuring the second angle of rotation with the second angle measuring device; reflecting a portion of the first beam from the target point as a second beam; measuring a first distance from the coordinate measurement device to the target point with the distance meter, the measured distance based at least in part on a third portion of the second beam of light received by a first optical detector; determining three-dimensional coordinates of the target point based at least in part on the first distance, the first angle of rotation, and the second angle of rotation; and storing the determined three-dimensional coordinates.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 6A-D are schematic figures that shows four types of prior art position detector assemblies.

FIGS. 8A and 8B are schematic figures showing fiber-optic elements within a prior art fiber-optic network;

DETAILED DESCRIPTION

Figure 1:
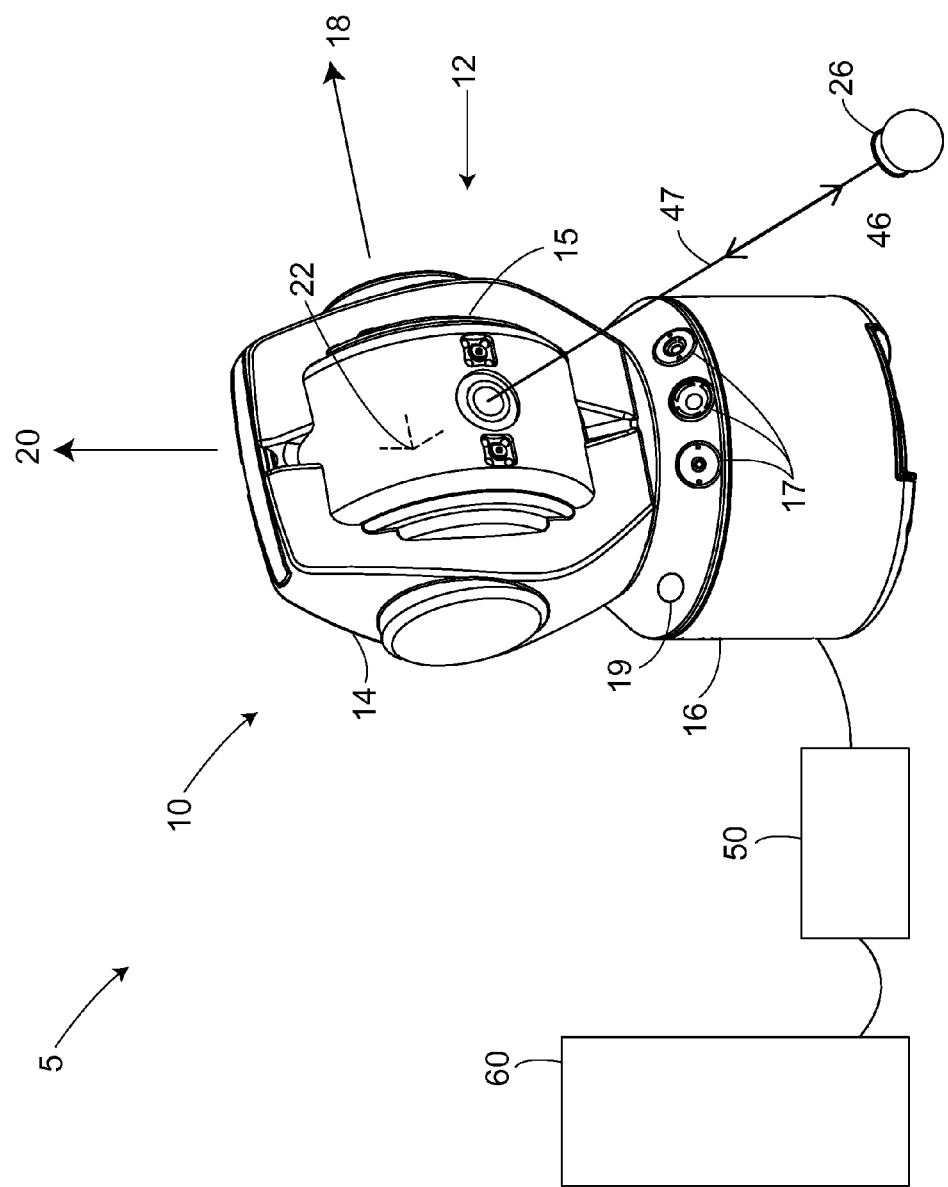
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 is approximately perpendicular to any plane parallel to both the zenith axis 18 and the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
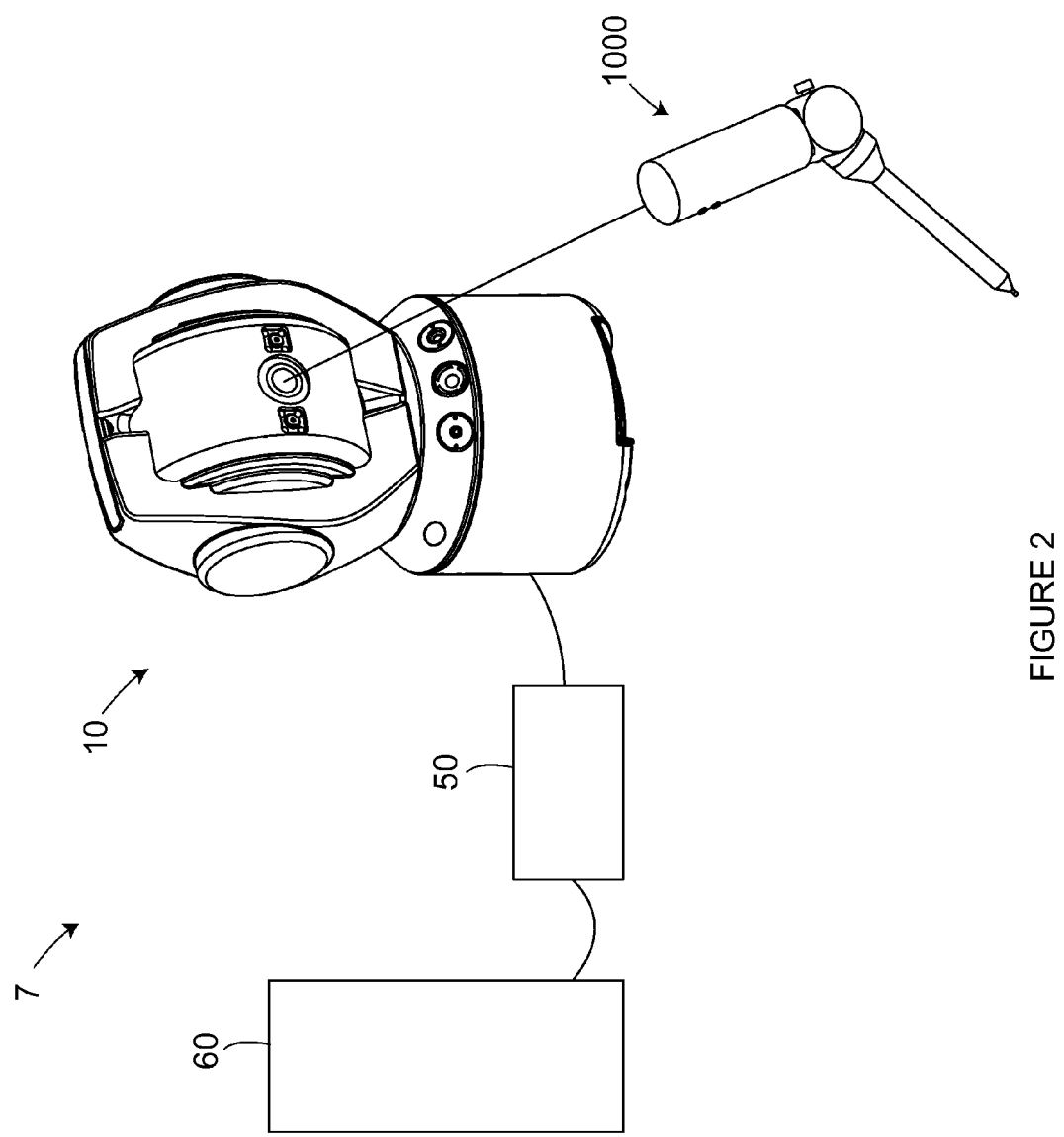
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
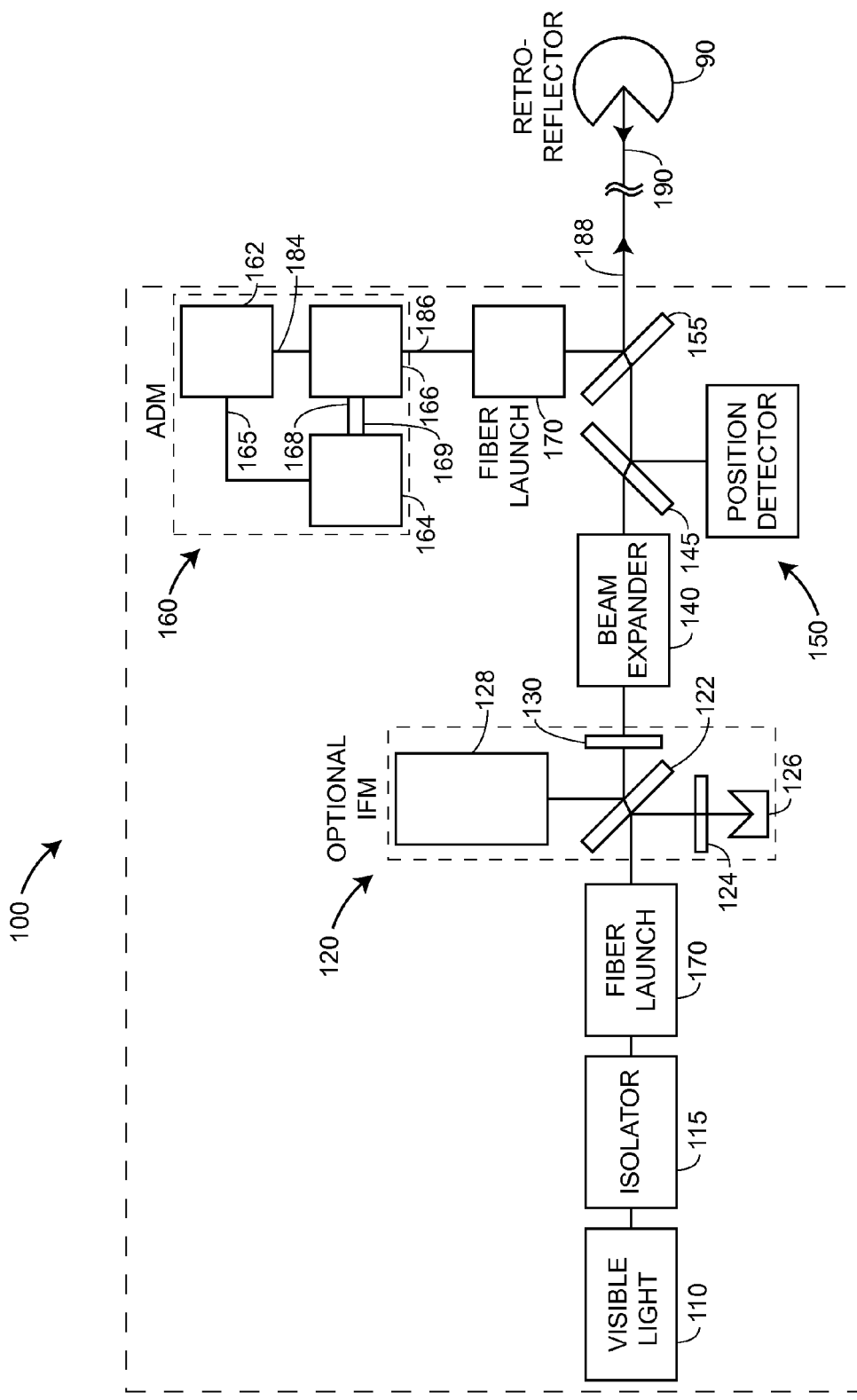
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed herein below with reference to FIG. 5.

Figure 4:
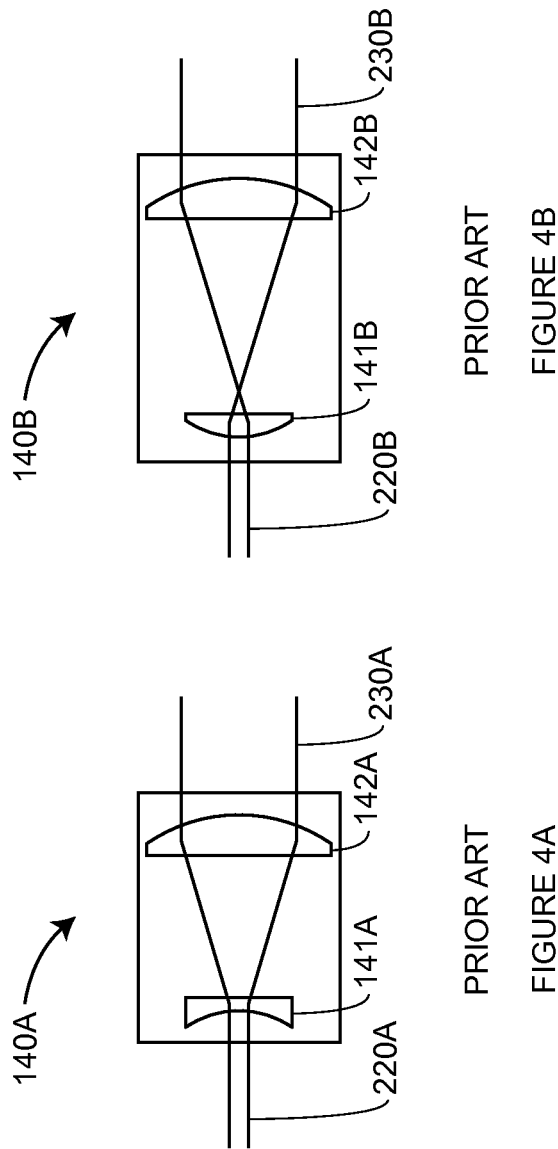
FIGS. 4A and 4B show two types of prior art afocal beam expanders.

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
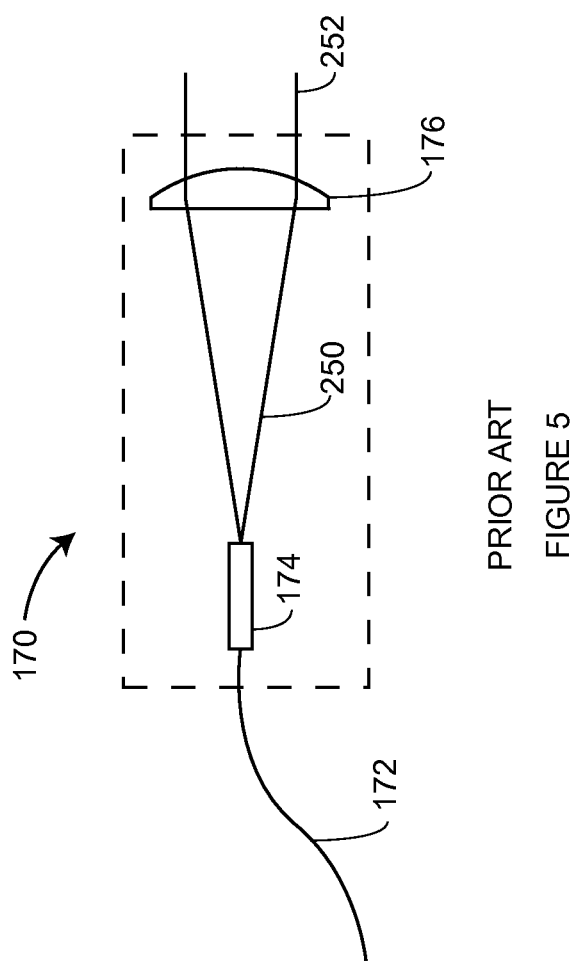
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
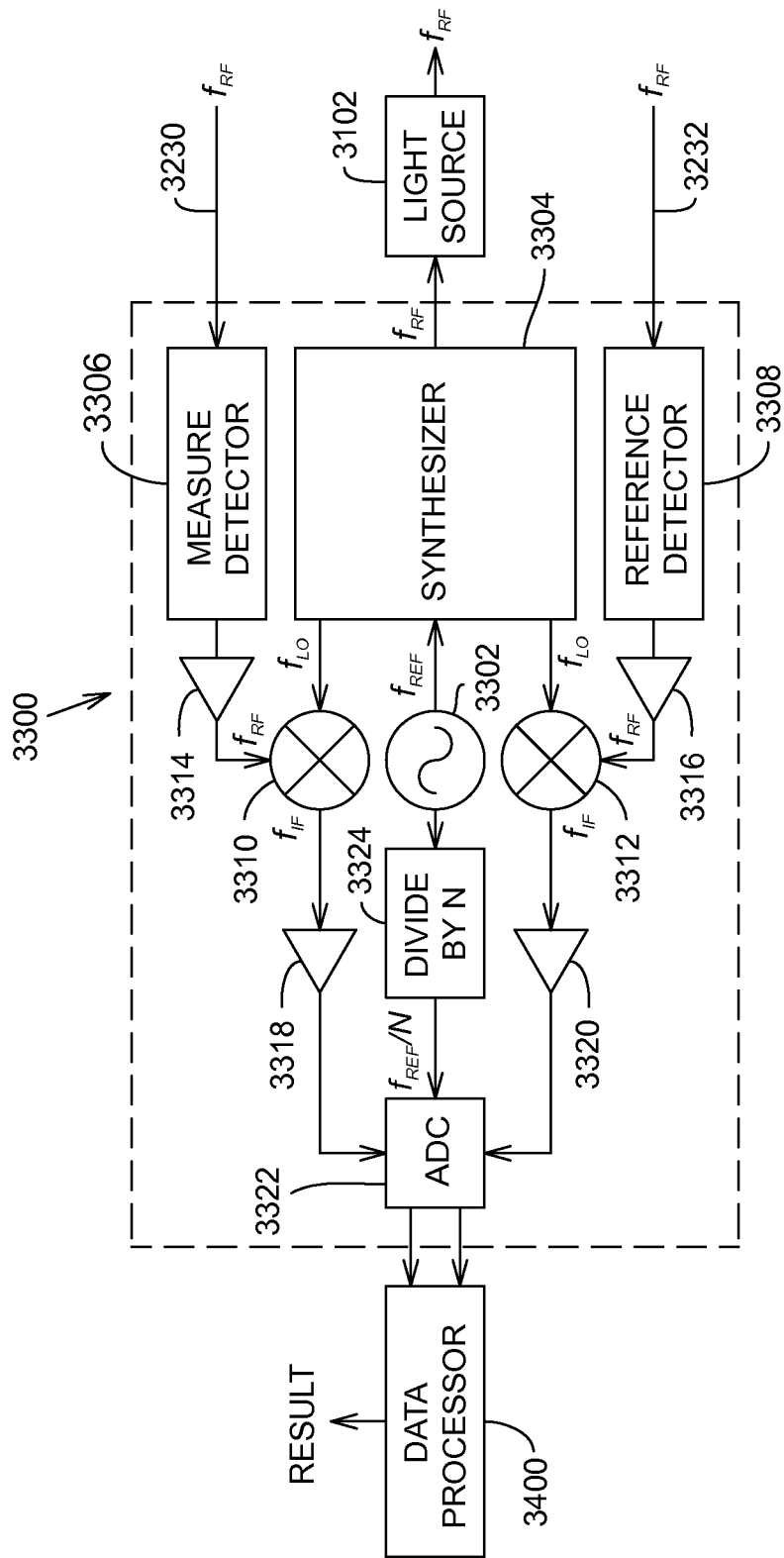
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}$–$f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by a 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer (120). It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
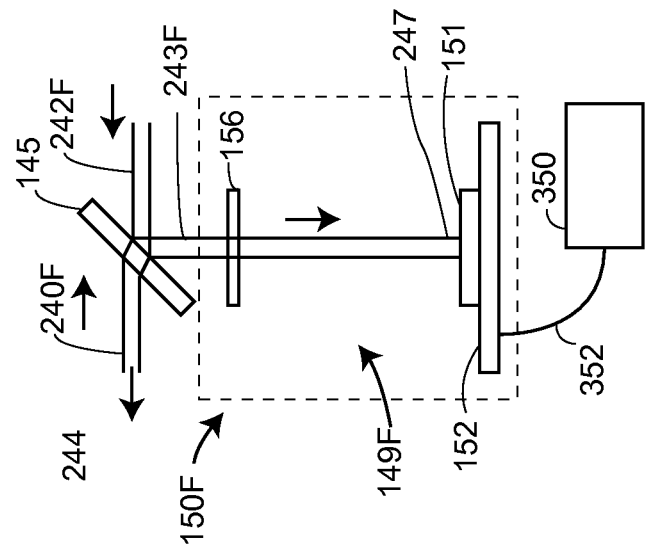
FIGS. 6E, 6F are schematic figures showing position detector assemblies according to embodiments of the present invention.
Figure 6F:
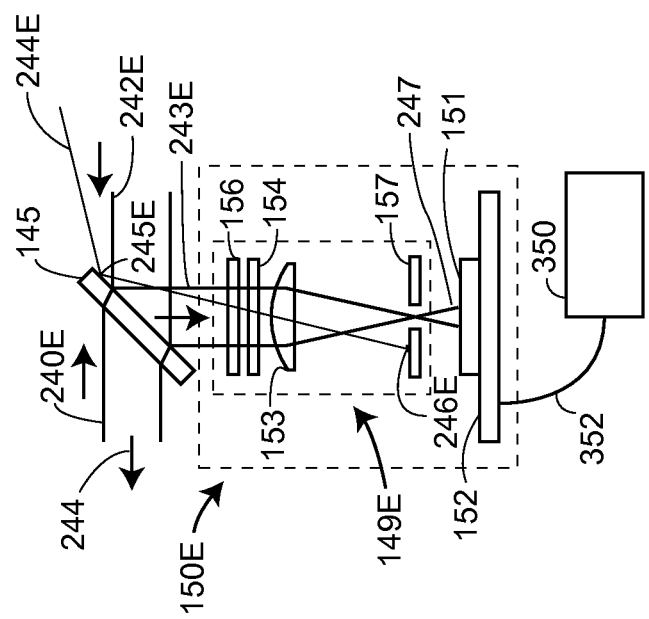

FIG. 6E shows a position detector assembly according to embodiments of the present invention that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. patent application Ser. No. 13/370,339 filed Feb. 10, 2012, and Ser. No. 13/407,983, filed Feb. 29, 2012, the contents of which are incorporated by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
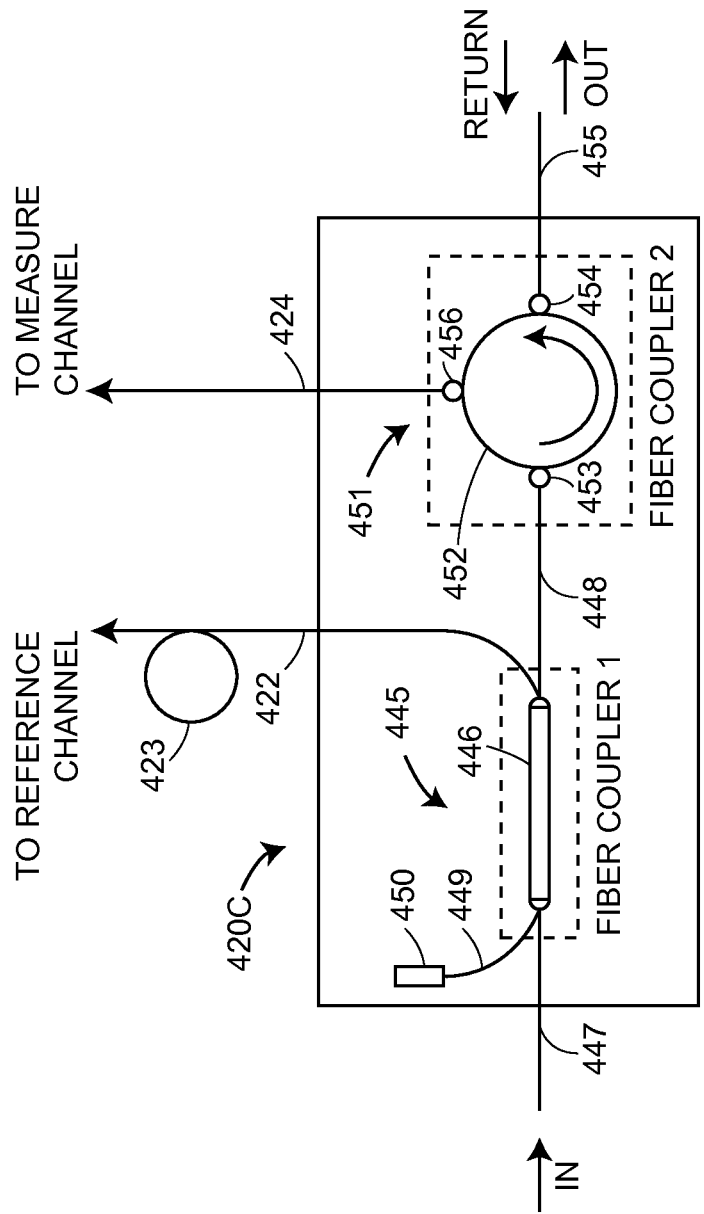
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
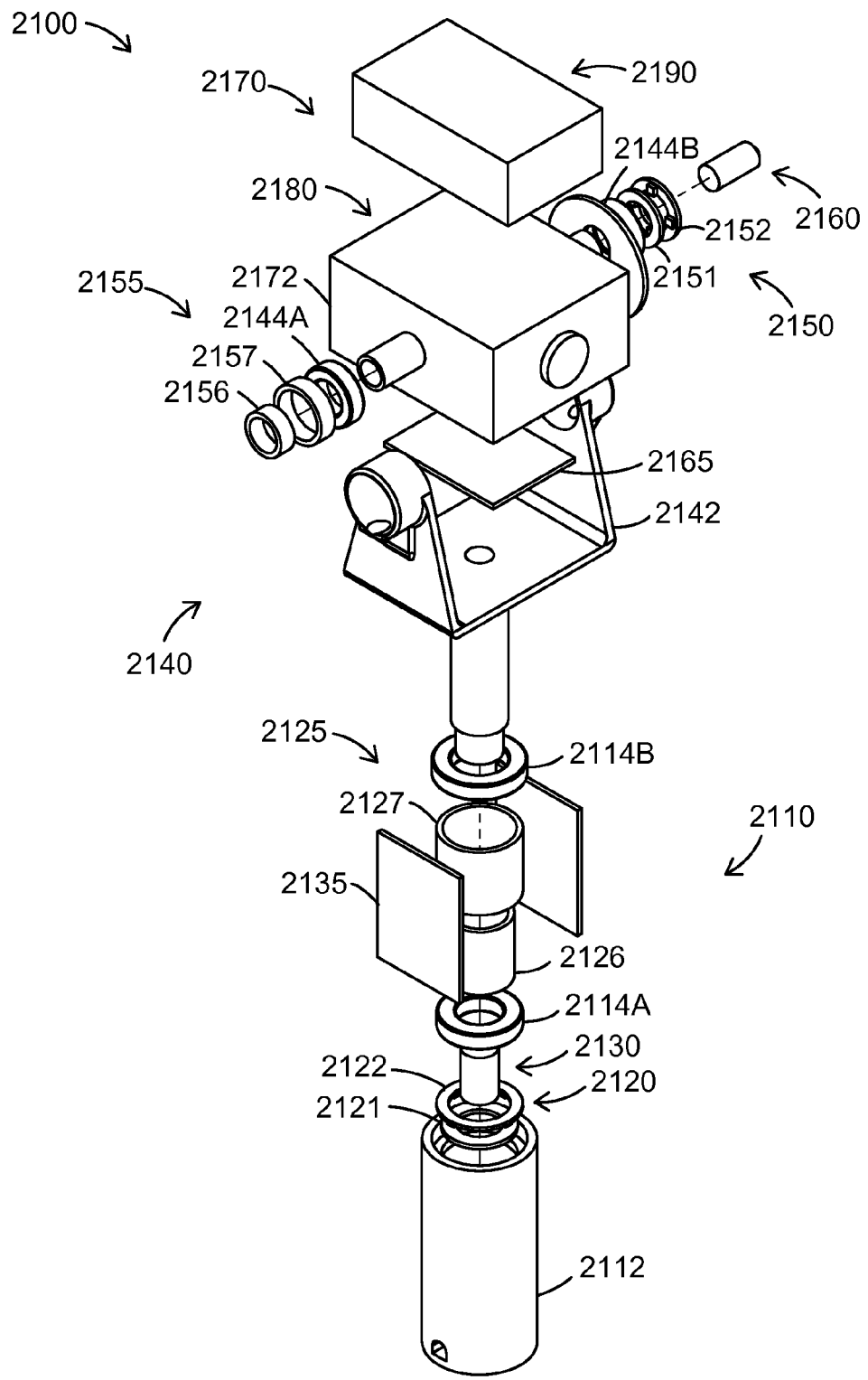
FIG. 9 is an exploded view of a prior art laser tracker.
Figure 10:
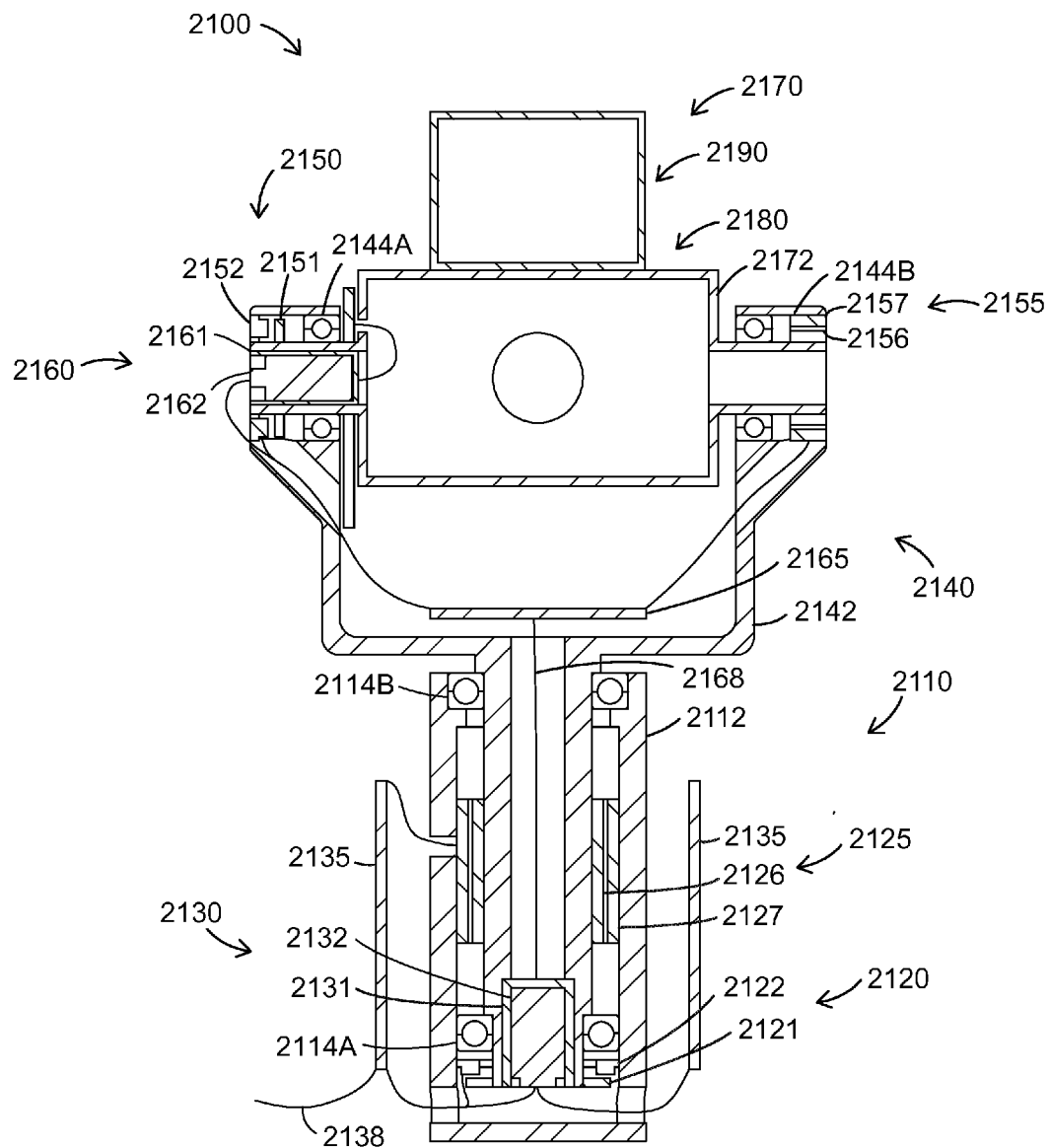
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Published Patent Application No. 2010/0128259 to Bridges et al., incorporated by reference. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
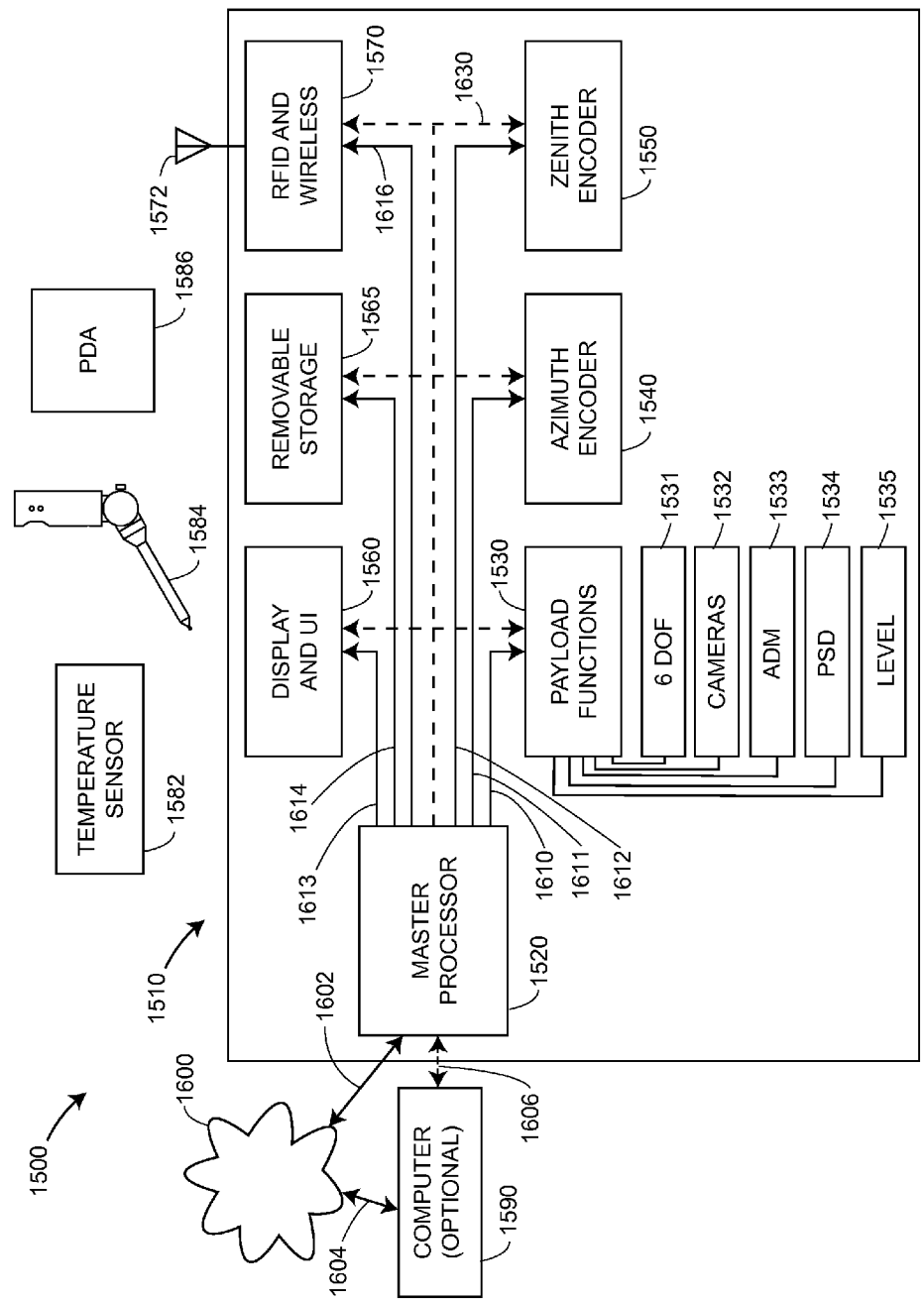
FIG. 11 is a block diagram of the computing and communication elements of a laser tracker in accordance with an embodiment of the present invention.

FIG. 11 is a block diagram depicting a dimensional measurement electronics processing system 1500 that includes a laser tracker electronics processing system 1510, peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, and Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in opto-electronic system 500 of FIG. 12A.

Figure 12A:
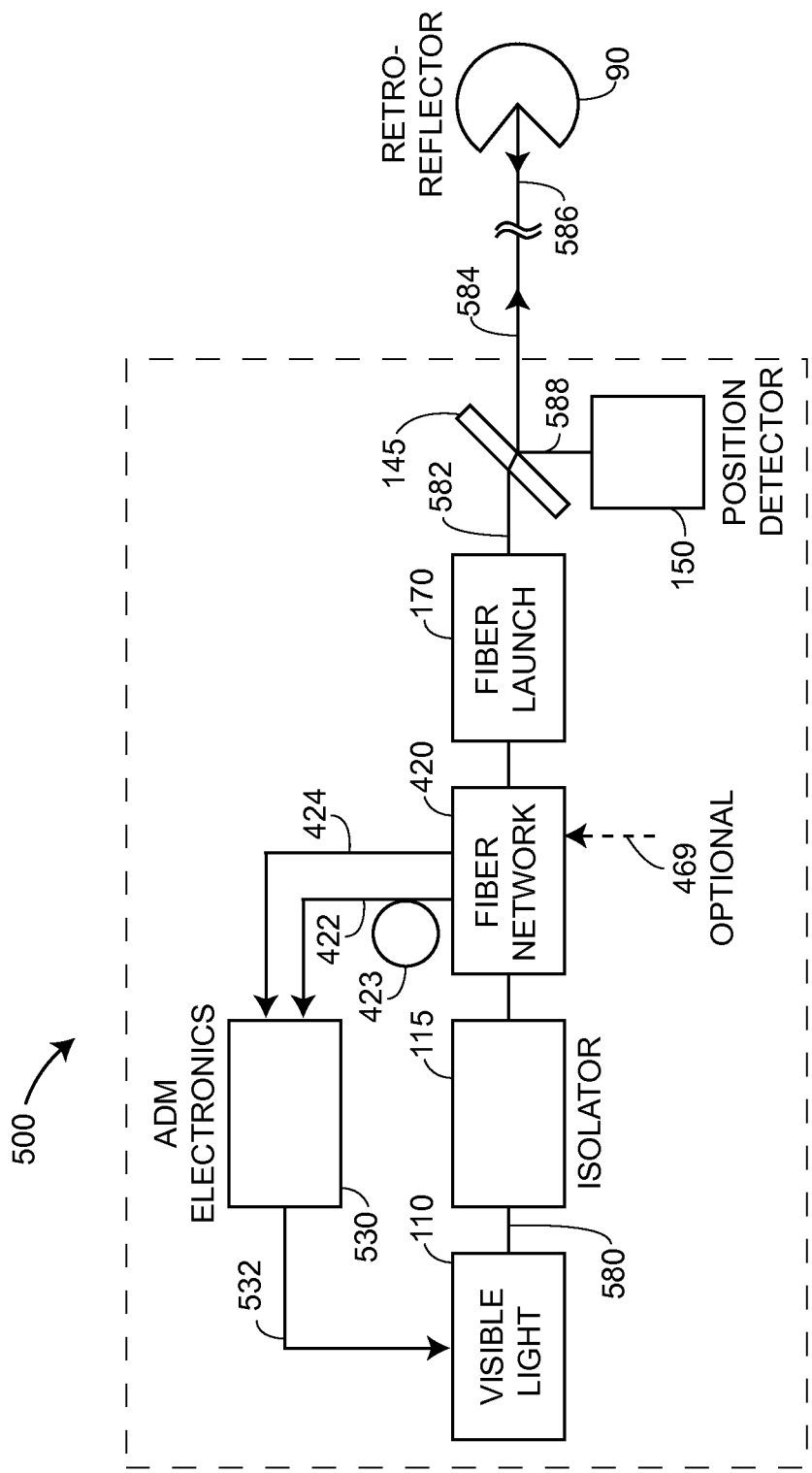
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
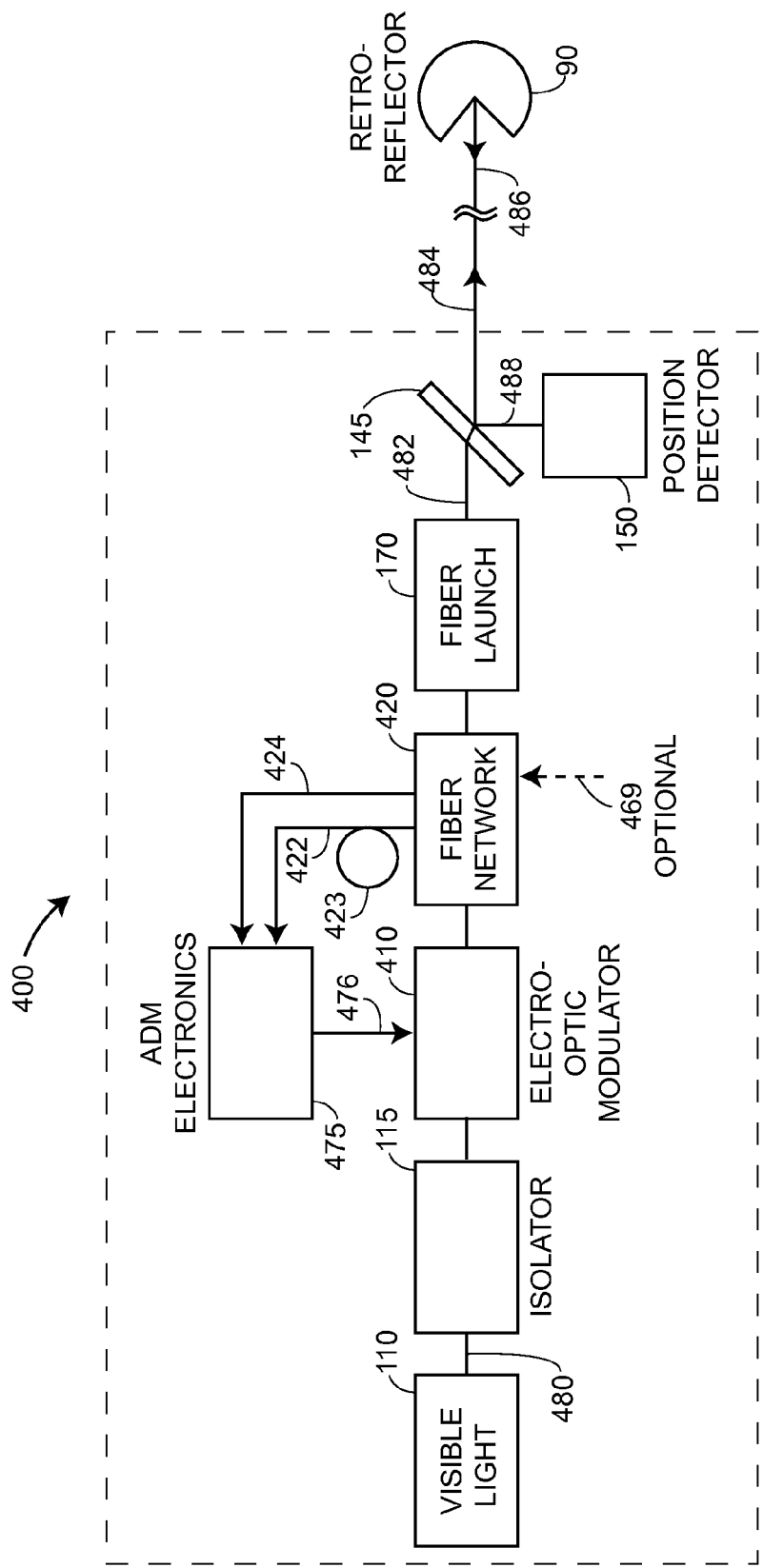
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
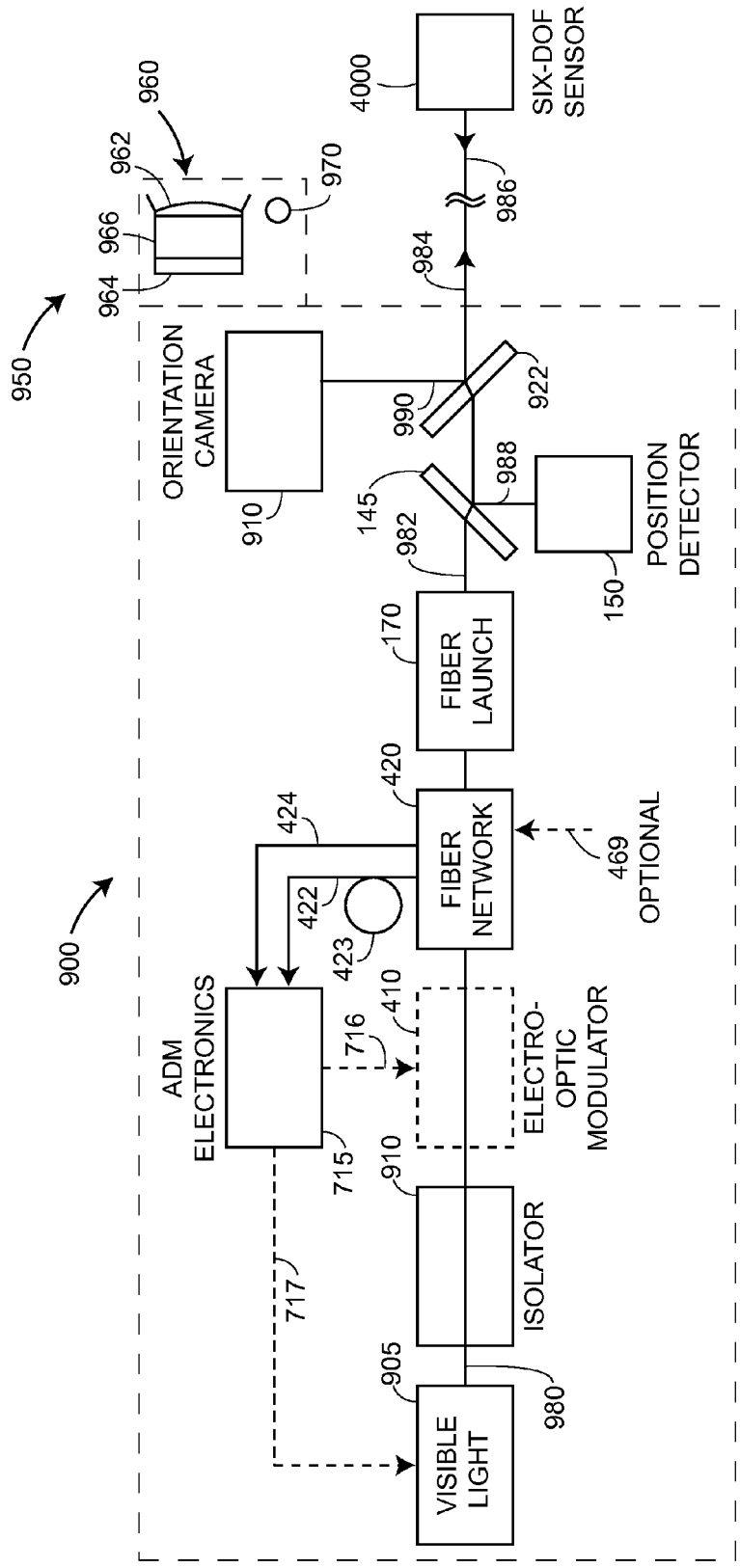
FIG. 13 is a block diagram of elements in a laser tracker with six DOF capability according to an embodiment of the present invention.

FIG. 13 shows an embodiment of a locator camera system 950 and an optoelectronic system 900 in which an orientation camera is combined with the optoelectronic functionality of a 3D laser tracker to measure six degrees of freedom. The optoelectronic system 900 includes a visible light source 905, an isolator 910, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 910, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beamsplitter 145 and is lost. A portion of the light passes through the beam splitter 145, through the beam splitter 922, and travels out of the tracker to six degree-of-freedom (DOF) device 4000. The six DOF device 4000 may be a probe, a scanner, a projector, a sensor, or other device.

On its return path, the light from the six-DOF device 4000 enters the optoelectronic system 900 and arrives at beamsplitter 922. Part of the light is reflected off the beamsplitter 922 and enters the orientation camera 910. The orientation camera 910 records the positions of some marks placed on the retroreflector target. From these marks, the orientation angle (i.e., three degrees of freedom) of the six-DOF probe is found. The principles of the orientation camera are described hereinafter in the present application and also in patent '758. A portion of the light at beam splitter 145 travels through the beamsplitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The camera includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems are available on the laser tracker, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

Figure 14A:
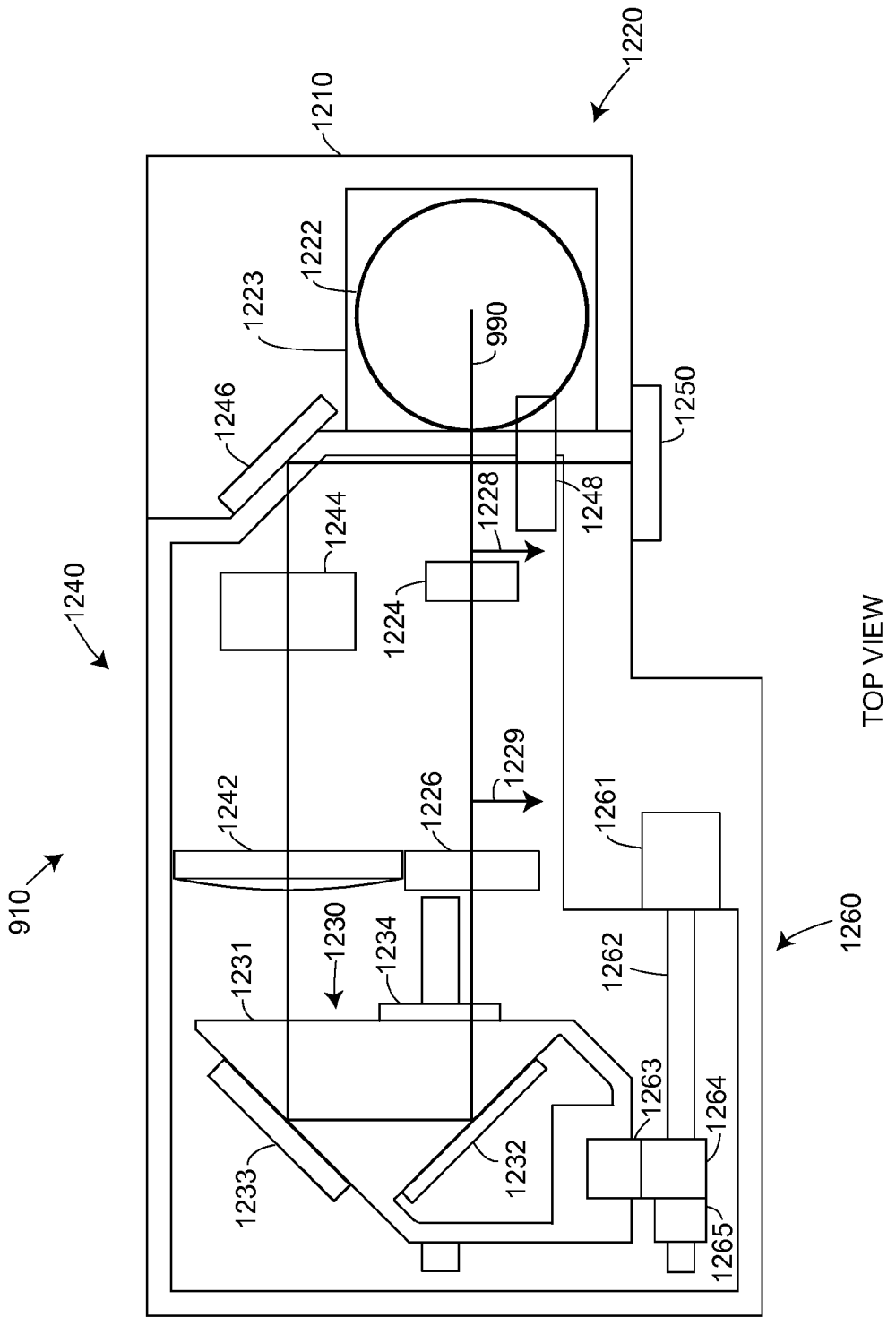
FIGS. 14A-D are block diagrams of elements in a laser tracker having six DOF capability according to an embodiment of the present invention.
Figure 18:
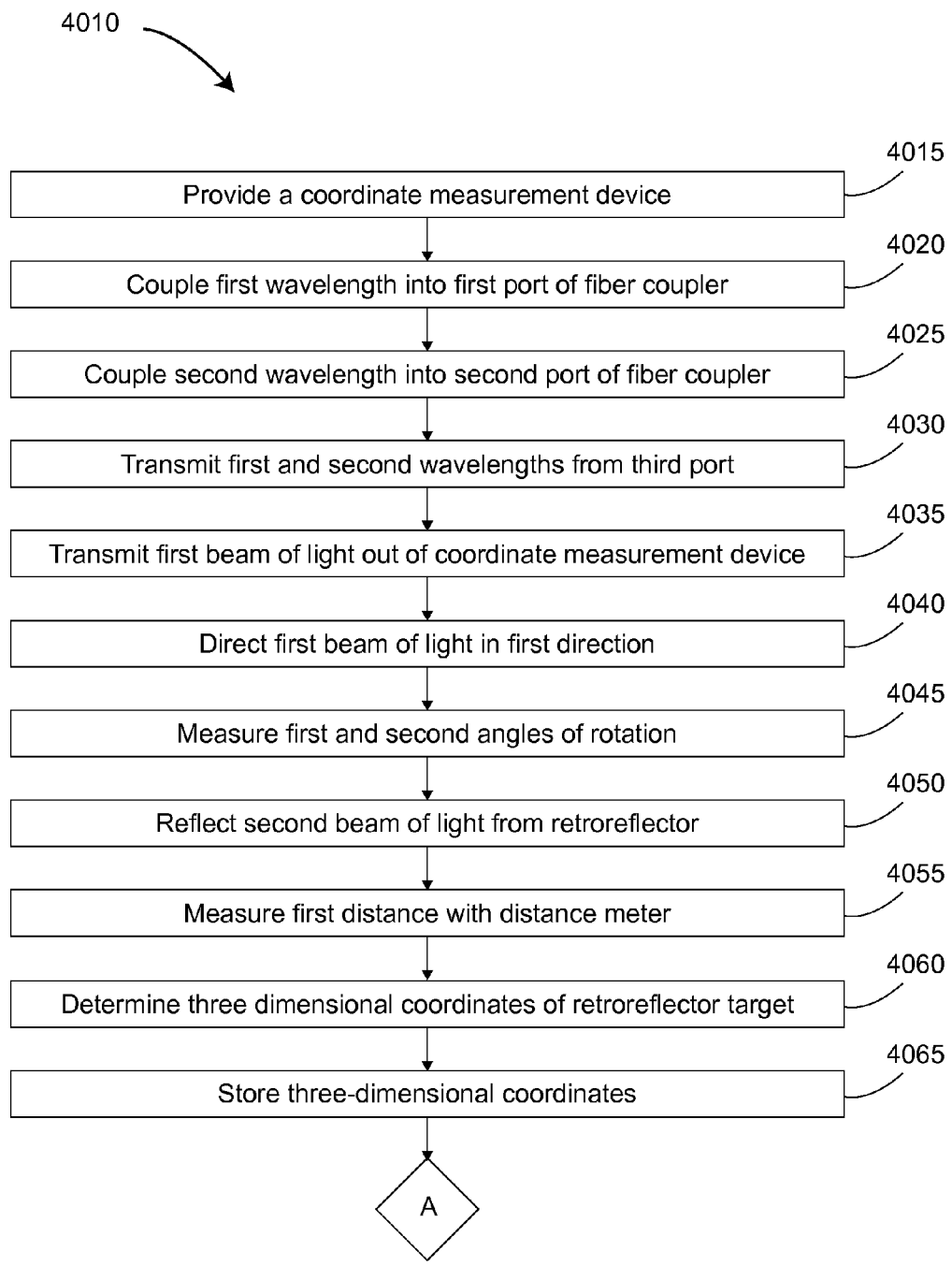
FIG. 18 is a flowchart of a method for measuring three-dimensional coordinates of a retroreflector target according to embodiments of the present invention.
Figure 19:
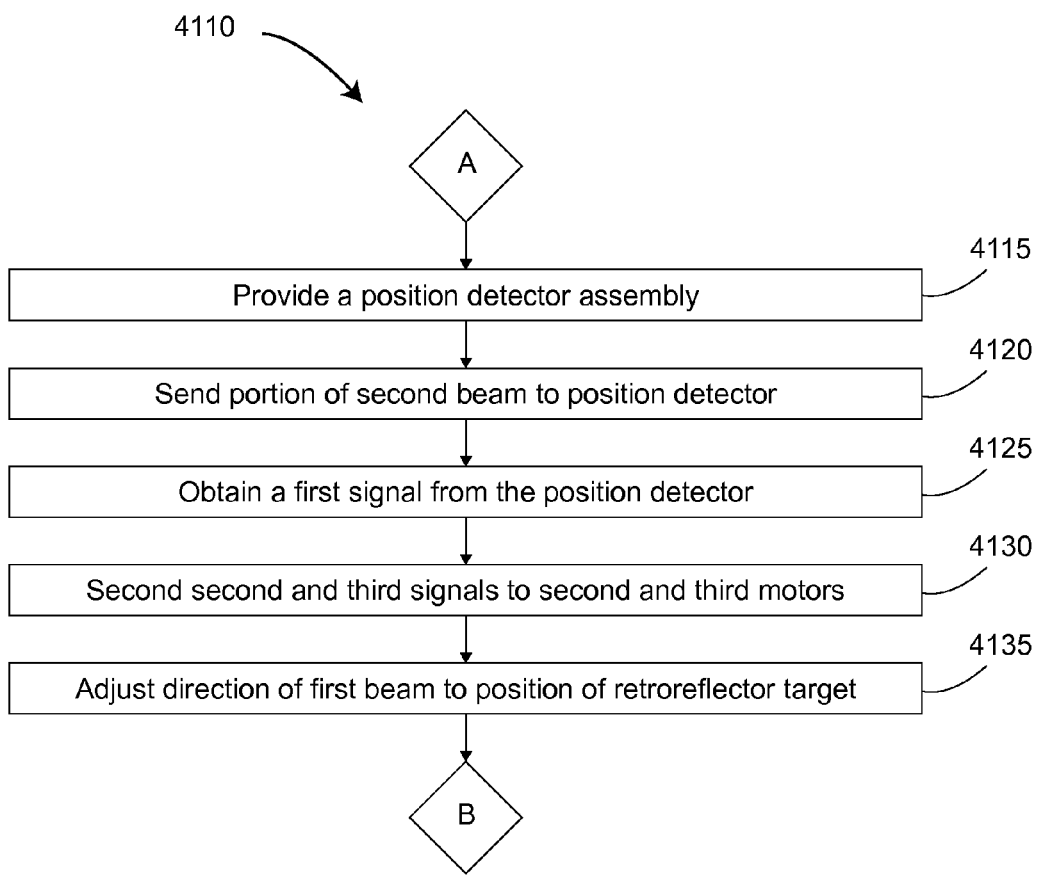
FIG. 19 is flowchart of a method for measuring three-dimensional coordinates of a retroreflector target according to embodiments of the present invention.

FIG. 14A shows an embodiment of an orientation camera 910, which may be used in the optoelectronic systems of FIGS. 18 and 19. The general principles of the orientation camera are described in patent '758 and are generally adhered to in orientation camera 910. In an embodiment, the orientation camera 910 includes a body 1210, an afocal beam reducer 1220, a magnifier 1240, a path length adjuster 1230, an actuator assembly 1260, and a photosensitive array 1250. The afocal beam reducer includes a positive lens 1222, a mirror 1223, and negative lenses 1224, 1226. The afocal beam reducer has the property that a ray of light that enters lens 1222 parallel to an optical axis—an axis that passes through the center of the lenses—emerges from lens 1226 also parallel to the optical axis. The afocal beam reducer also has the property that an image has a constant size regardless of the distance from the lens to an object. The magnifier 1240 includes a positive lens 1242, negative lenses 1244, 1248, and a mirror 1246. The magnifier has the same function as a microscope objective but is scaled to provide a larger image. The photosensitive array 1250 may, for example, be a CMOS or CCD array that converts the light that strikes it into an array of digital values representing the irradiance of the light at each pixel of the photosensitive array. The pattern of irradiance may reveal, for example, the marks on a six-DOF target. The path length adjuster 1230 includes a platform 1231, two mirrors 1232, 1233, and a ball slide 1234. The mirrors 1232, 1233 are mounted on the platform 1231 so that when the platform 1231 is moved, the distance between the afocal beam reducer 1220 and the magnifier 1240 is changed. This change in distance is needed to keep a clear image on the photosensitive array 1250 for a changing distance from the laser tracker to the target. The platform 1231 is mounted on the ball slide 1234, which provides the platform with low friction linear motion. In an embodiment, the actuator assembly 1260 includes a motor 1261, a motor shaft 1262, a flexible coupling 1263, an adapter 1264, and a motor nut 1265. The motor nut 1265 is fixedly attached to the adapter. As the threaded motor shaft 1262 is rotated by the motor 1261, the motor nut 1265 is moved either farther from or nearer to the motor, depending on the direction of rotation of the motor shaft. The flexible coupler 1263, which is attached to the adapter 1264, allows the platform to move freely even if the motor shaft 1262 and the ball slide 1234 are not parallel to one another.

In an embodiment, the orientation camera 910 provides constant transverse magnification for different distances to the target. Here transverse magnification is defined as the image size divided by the object size. The lenses shown in FIG. 14A were selected to produce a constant image size on the photosensitive array 1250 of 3 mm for an object size of 13 mm. In this instance, the transverse magnification is 3 mm/13 mm=0.23. This transverse magnification is held constant for a target placed a distance from the tracker of between 0.5 meter and 30 meters. This image size of 3 mm might be appropriate for a ¼ inch CCD or CMOS array. In an embodiment, the transverse magnification is four times this amount, making it appropriate for a one inch CCD or CMOS array. An orientation camera with this increased transverse magnification can be obtained in the same size body 1210, by changing the focal lengths and spacings of the three lenses in the magnifier 1240.

In an embodiment shown in FIG. 14A, the effective focal lengths of the three lens elements 1222, 1224, and 1226 of the beam reducer 1220 are 85.9 mm, −29.6 mm, and −7.2 mm, respectively. A virtual image is formed after the light from the object passes through these three lens elements. For an object placed 0.5 meter from the laser tracker, the virtual image 1229 has a size of 0.44 mm and is located 7 mm from the lens 1226. For an object placed 30 meters from the laser tracker, the virtual image 1228 has a size of 0.44 mm and is located 1.8 mm from the lens 1224. The distance between the virtual image 1228 and the virtual image 1129 is 39.8 mm, which means that the platform needs a maximum travel range of half this amount, or 19.9 mm. The transverse magnification of the beam reducer 1220 is 0.44 mm/13 mm=0.034. The effective focal lengths of the three lens elements 1242, 1244, and 1228 of the magnifier are 28.3 mm, −8.8 mm, and −8.8 mm, respectively. The size of the image at the photosensitive array 1250 is 3 mm for a target located 0.5 meter from the laser tracker, 30 meters from the laser tracker, or any distance in between. The transverse magnification of the magnifier is 3 mm/0.44 mm=6.8. The overall transverse magnification of the orientation camera is 3 mm/13 mm=0.23. In another embodiment, the transverse magnification of the magnifier is increased by a factor of 4 to 4×6.8=27, thereby producing an overall transverse magnification of 12 mm/13 mm=0.92 for any distance from 0.5 to 30 meters.

Figure 14B:
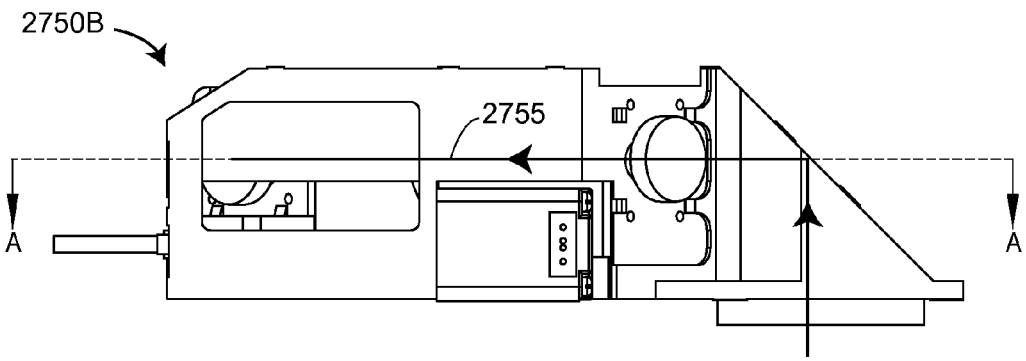
Figure 14C:
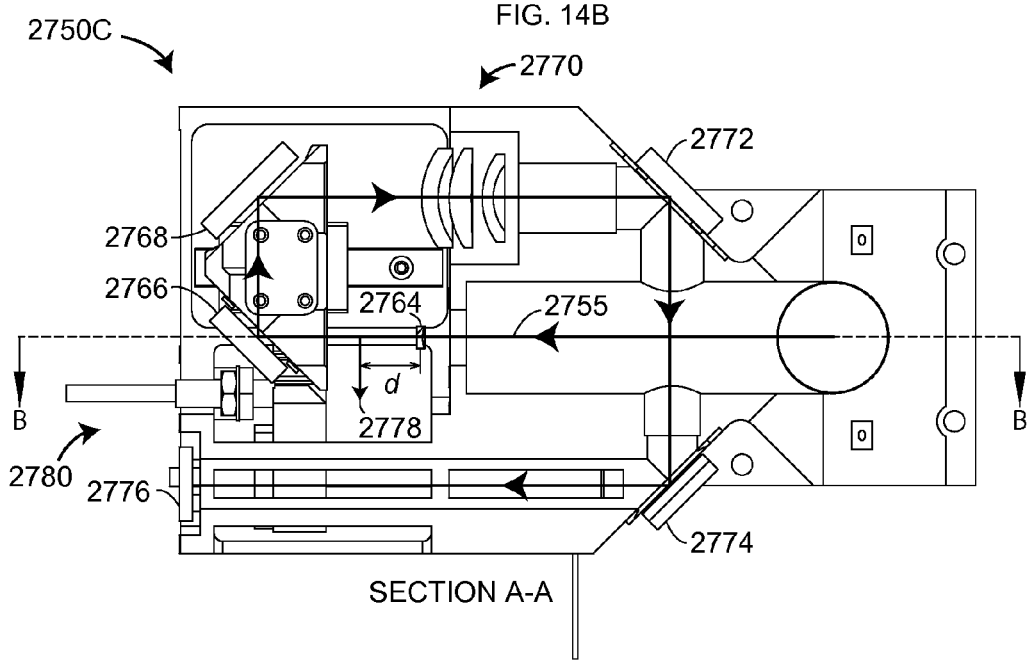
Figure 14D:
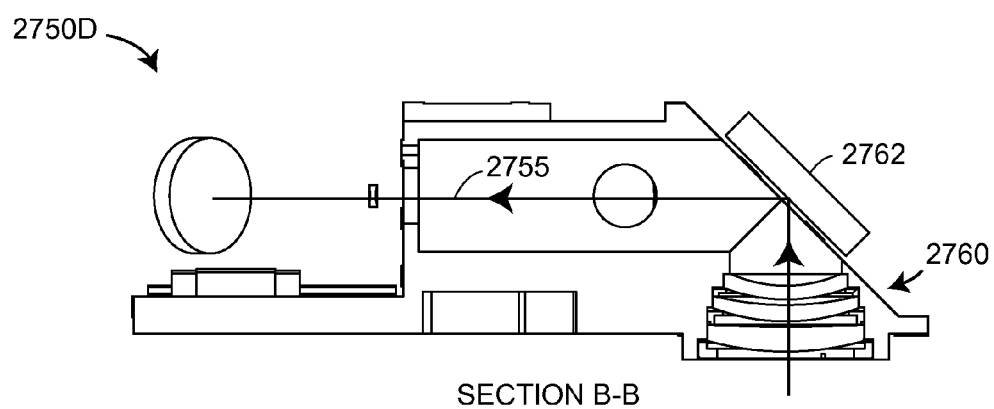

Another embodiment of an orientation camera is shown in FIGS. 14B-D. FIG. 14B is a side view of an orientation camera assembly 2750B. FIG. 14C is a top view 2750C of a section A-A shown in FIG. 14B. FIG. 14D is a side sectional view 2750D of a section B-B of FIG. 14C. The path of light beam 2755 is shown in each of the three figures. Light passes through a first collection of lenses 2760, reflects off mirror 2762, passes through lens 2764, reflects off mirrors 2766, 2768, passes through a section collection of lenses 2770, reflects off mirrors 2772, 2774, and strikes photosensitive array 2776. The first collection of lenses 2760 and the lens 2764 form an afocal lens system. As explained herein above, this means that a ray entering the first collection of lenses 2760 parallel to the optical axis will exit the lens 2764 parallel to the optical axis. Because the retroreflector (not shown in FIGS. 14B-D is a finite distance from the laser tracker, the afocal lens system will produce a virtual image 2778 at some distance from the lens 2764. This distance d from the lens 2764 will depend on the distance from the retroreflector from the laser tracker. For example, in an embodiment, the virtual image is about d=82 mm from the lens 2764 when the retroreflector is four meters from the tracker and about d=51 mm from the lens 2764 when the retroreflector is forty meters from the tracker. The second collection of lenses relays the virtual image 2778 onto the photosensitive array. A motorized actuator 2780 adjusts the position of mirrors 2766, 2768 in order to maintain the correct distance from the virtual image 2778 to the second collection of lenses 2770, thereby keeping the image on the photosensitive array 2776 in focus. In an embodiment, the first collection of lenses 2755 has a combined focal length of 112 mm, the lens 2764 has a focal length of −5.18 mm, and the second collection of lenses 2770 has a combined focal length of about 59.3 mm. The overall magnification of the system is approximately ⅛, which means that the size of the light pattern on the photosensitive array 2776 is about one-eighth the size of the light pattern on the retroreflector. This is an example of a lens system that maintains a constant magnification regardless of the distance from the laser tracker to the retroreflector.

Other combinations of lenses can be combined to make an orientation camera having a constant transverse magnification. Furthermore, although having constant transverse magnification is helpful, other lens systems are also useable. In general, the cameras of FIGS. 14A-D are distinguished by having a zoom capability, a narrow field of view, and an alignment with the optical axis of the laser tracker.

Figure 15:
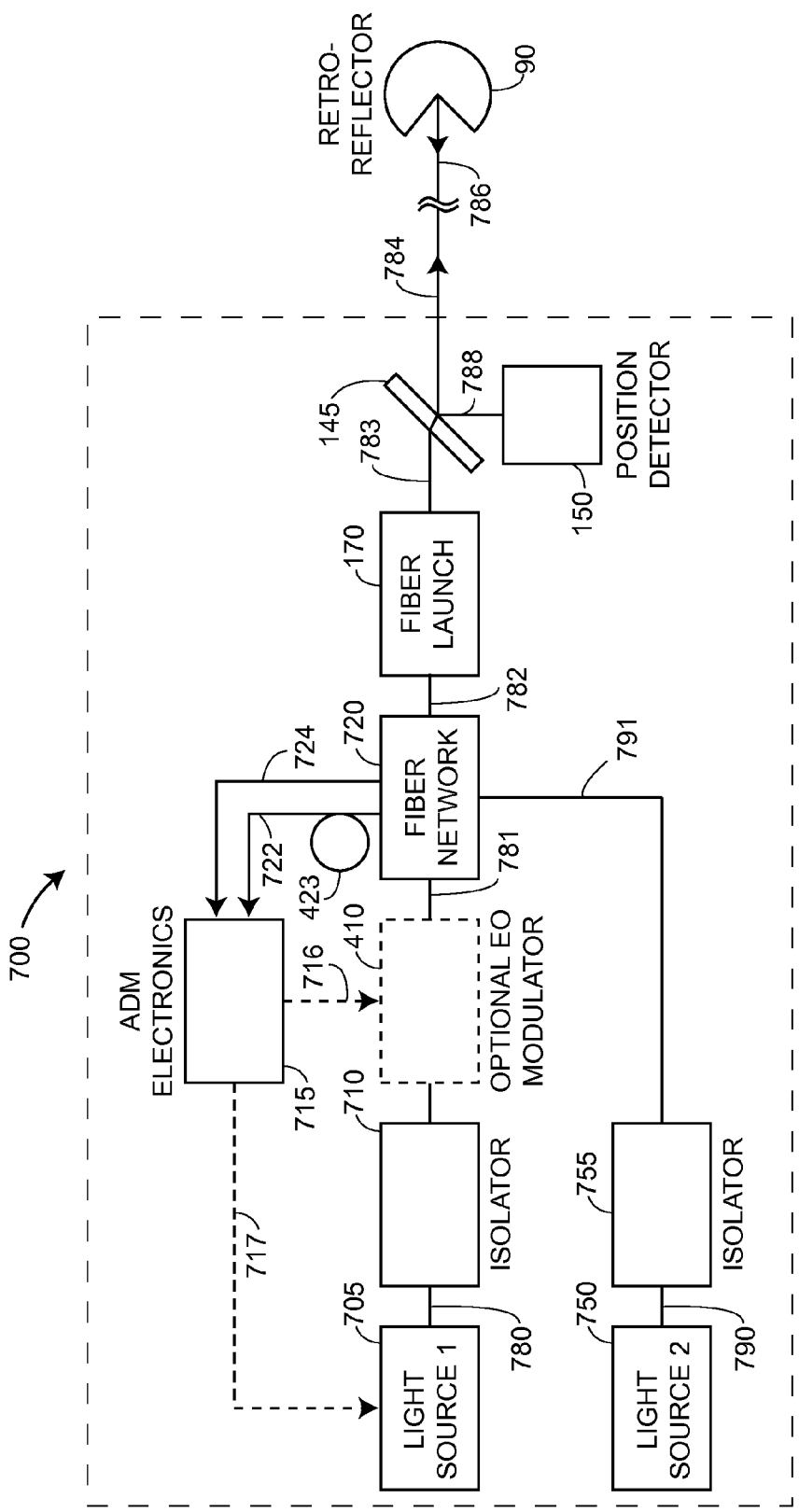
FIG. 15 is a block diagram of elements in a laser tracker according to an embodiment of the present invention.

FIG. 15 shows an embodiment of an optoelectronic system 700 in which two different wavelengths of light are combined using a fiber optic coupler. The optoelectronic system 700 includes a first light source 705, a second light source 750, a first isolator 710, a second isolator 755, an optional electrooptic modulator 410, ADM electronics 715, a fiber network 720, a fiber launch 170, a beam splitter 145, and a position detector 150. The first light source 705 may be, for example, a diode laser that operates at 780 nm. The second light source may be, for example, a red or green diode laser. Light from the first light source 705 is sent over an optical fiber 780 through an isolator 710, which may be a Faraday isolator or an attenuator, for example. The isolator 710 may be fiber coupled at its input and output ports. The isolator 710 may send the light to an electrooptic modulator 410, which modulates the light. If the electrooptic modulator 410 is used, an electrical signal 716 from ADM electronics 715 drives the modulation in the electrooptic modulator 410. Alternatively, if the electrooptic modulator 410 is omitted, the ADM electronics 715 sends a modulation signal directly to the light source 705. The light from the first light source travels through optical fiber 781 to the fiber network 720. Some of the light is routed through fiber length equalizer 423 and optical fiber 722 into the reference channel of the ADM electronics 715. Another part of the light travels out of the fiber network 720 through optical fiber 782 to the fiber launch, which sends the light beam 783 into free space. A small amount of the light reflects off beam splitter 145 and is lost. The rest of the light passes through beam splitter 145, travels to retroreflector 90 as light beam 784, and travels back to the beam splitter 145 as light beam 786. Some of the light reflects off the beam splitter 145 and travels to the position detector 150. Another part of the light passes through the fiber launch and is coupled back into the optical fiber 782. The light passes into the fiber network 720 and travels over optical fiber 724 to the measure channel of the ADM electronics 715.

Figure 16:
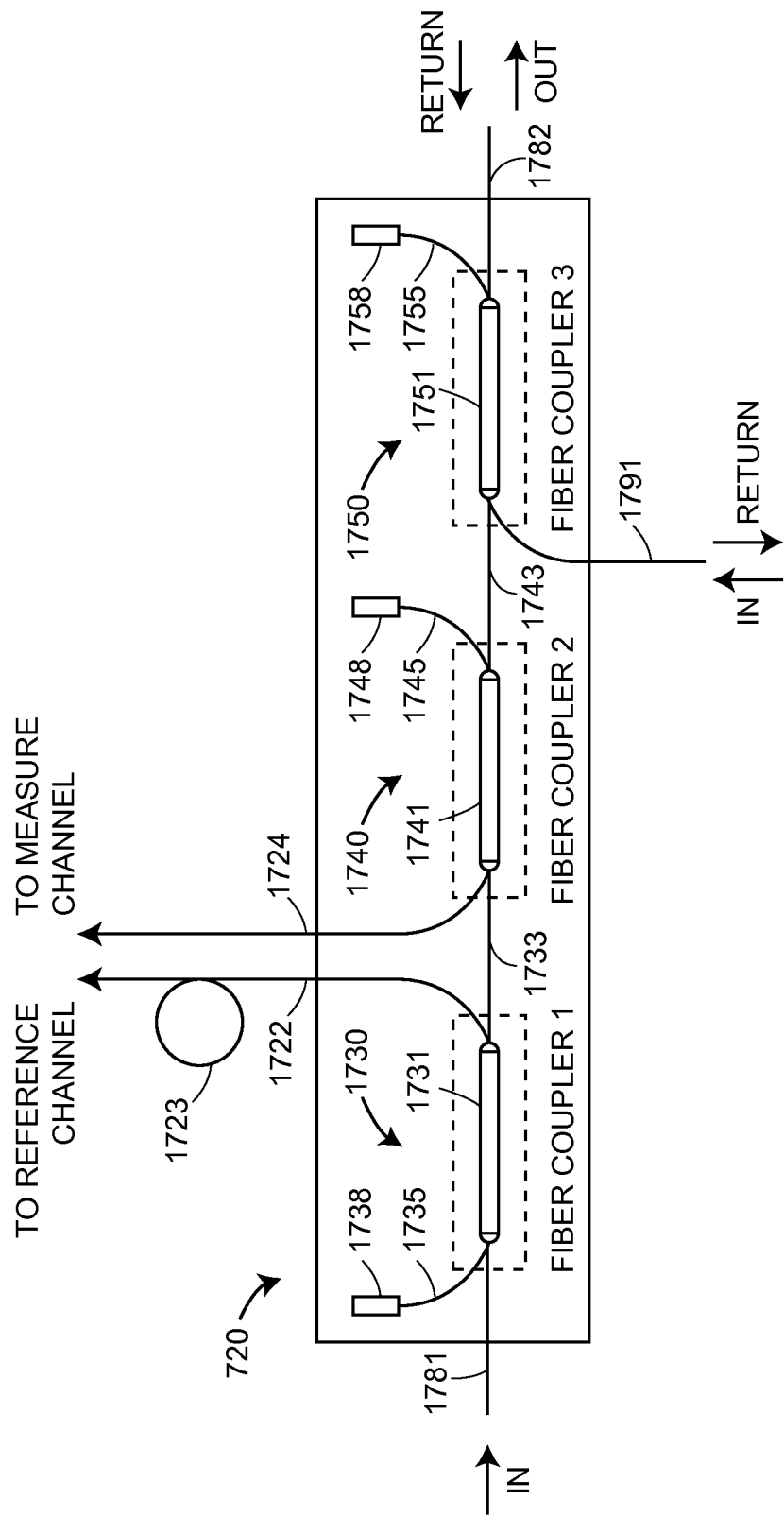
FIG. 16 is a schematic diagram showing elements within a fiber-optic assembly according to an embodiment of the present invention.

The second light source 750 sends a second beam of light onto optical fiber 790, through isolator 755, through optical fiber 791 and into fiber network 720. An embodiment of fiber network 720 is shown in FIG. 16. The light from optical fiber 1781 enters fiber network 720 at the input port. The light travels through a first fiber coupler 1730. Part of the light travels through optical fiber 1722 and fiber length compensator 1723 before entering the reference channel of ADM electronics 715. Some of the light travels through a second fiber coupler 1740 and a third fiber coupler 1750 before passing out of the fiber network onto optical fiber 1782. The light from optical fiber 1791 enters into the third fiber coupler 1750, where it is combined with the light from optical fiber 1743 to form a composite light beam that travels on optical fiber 1782. The ports attached to optical fibers 1781 and 1791 are two input ports, and may be considered a first port and a second port. The ports attached to optical fibers 1782 and 1755 are output ports and may be considered a third port and a fourth port. The optical coupler 1750 is a dichroic coupler because it is designed to use two wavelengths. After the composite light beam carried in optical fiber 1782 travels out of the laser tracker and reflects off retroreflector 90, it returns to the fiber network 720. The light from the first light source passes through the third fiber coupler 1750, the second fiber coupler 1740, and enters optical fiber 1724, which leads to the measure channel of the ADM electronics 715. The light from the second light source returns to optical fiber 1791 and travels to isolator 755, which keeps it from entering the second light source 750.

The couplers 1730, 1740, and 1750 may be of the fused type. With this type of optical coupler, two fiber core/cladding regions are brought close together and fused. Consequently, light between the cores is exchanged by evanescent coupling. In the case of two different wavelengths, it is possible to design an evanescent coupling arrangement that allows complete transmission of a first wavelength along the original fiber and complete coupling of a second wavelength over to the same fiber. In practical cases, it is not usually possible to obtain a complete (100 percent) coupling of the light so that the fiber-optic coupler provides lossless transmission. However, fiber-optic couplers that provide good coupling for two or more different wavelengths may be purchased and are readily available at common wavelengths such as 980 nm, 1300 nm, and 1550 nm. In addition, fiber-optic couplers may be purchased off-the-shelf for other wavelengths, including visible wavelengths, and may be custom designed and manufactured for other wavelengths. For example, in FIG. 16, it is possible to design fiber optic coupler 1750 so that the first light at its first wavelength travels from optical fiber 1743 to optical fiber 7153 with low optical loss. At the same time, the design can provide for a nearly complete coupling of the second light on optical fiber 1791 over to the optical fiber 1782. Hence it is possible to transfer the first light and the second light through the fiber optic coupler and onto the same fiber 1782 with low loss. It is possible to buy optical couplers that combine wavelengths that differ widely in wavelength. For example, it is possible to buy a coupler that combines light at a wavelength of 1310 nm with light at a wavelength of 660 nm. For propagation over long distances with propagation of both wavelengths in a single transverse mode while having relatively low loss of optical power during propagation through the optical fiber, it is generally required that the two wavelengths be relatively close together. For example, the two selected wavelengths might be 633 nm and 780 nm, which are relatively close together in wavelength values and could be transmitted through a single-mode optical fiber over a long distance without a high loss. An advantage of the architecture of the electrooptics assembly 700 is that the dichroic fiber coupler 1750 within the fiber network 720 is more compact that a free space beam splitter. In addition, the dichroic fiber coupler ensures that the first light and the second light are very well aligned without requiring any special optical alignment procedures during production.

Figure 17:
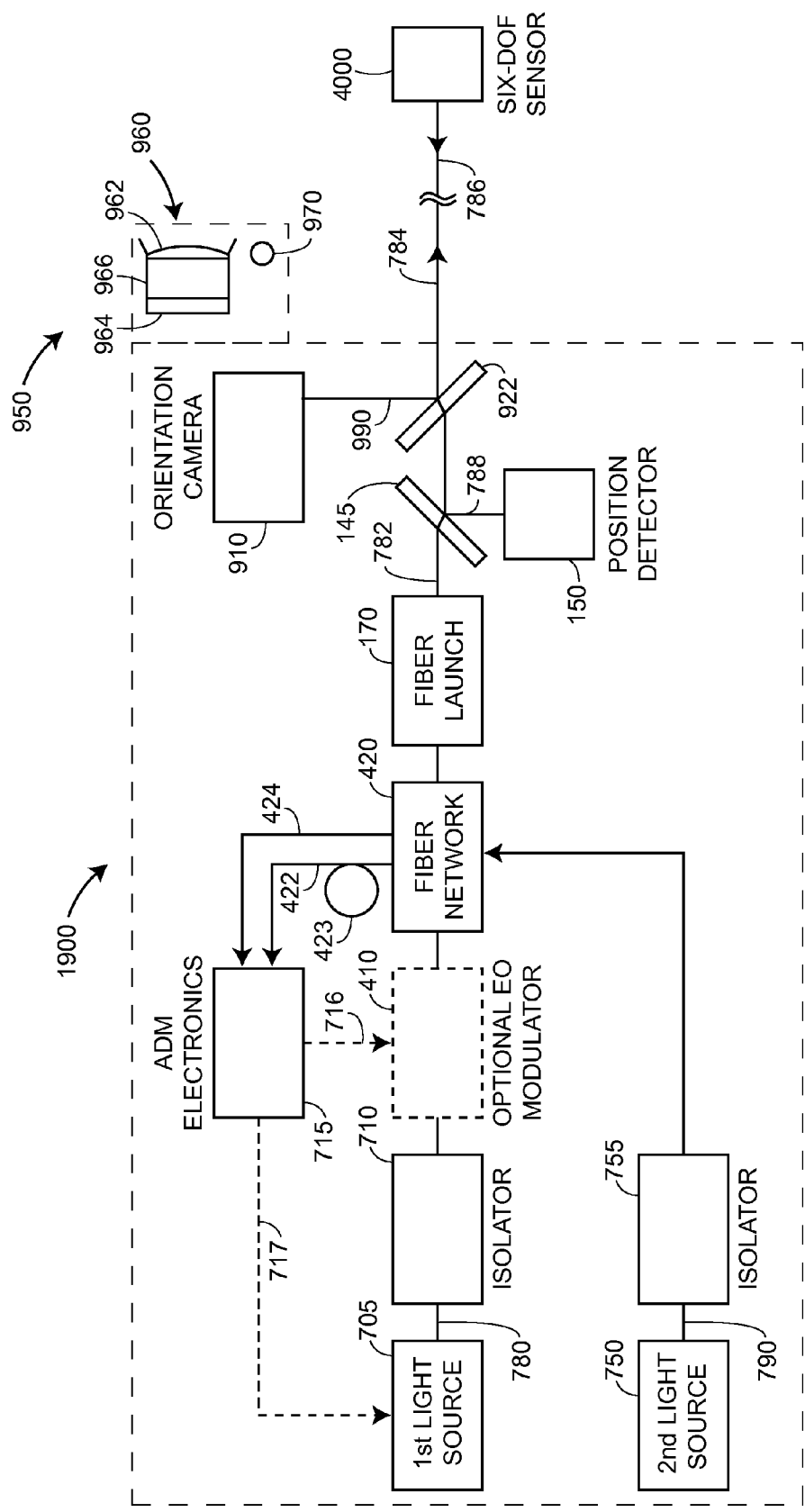
FIG. 17 is a block diagram of elements in a laser tracker having six DOF capability according to an embodiment of the present invention.

FIG. 17 shows an embodiment of an electrooptic system 1900 similar to the electrooptic system 900 of FIG. 13 except FIG. 17 contains two light sources—a first light source 705 and a second light source 750. The first light source 705, the second light source 750, the first isolator 710, and the second isolator 755 of FIG. 17 are the same components shown in FIG. 15 and described hereinabove.

FIG. 18 shows a method 4010 for measuring three-dimensional coordinates of a retroreflector target. A step 4015 is to provide a coordinate measurement device that includes a first light source that produces a first light at a first wavelength, a second light source that produces a second light at a second wavelength different than the first wavelength, a fiber-optic coupler that includes at least a first port, a second port, and a third port, an optical system, a first motor, a second motor, a first angle measuring device, a second angle measuring device, a distance meter, and a processor. A step 4020 is to couple a first portion (at a first wavelength) of the first light into the first port. A step 4025 is to couple a second portion (at a second wavelength) of the second light into the second port. A fourth step 4030 is to transmit a third light from the third port, the third light containing a portion of the first portion and a portion of the second portion. A fifth step 4035 is to transmit a portion of the third light through the optical system and out of the coordinate measurement device as a first beam of light. A step 4040 is to direct the first beam of light in a first direction, the first direction determined by a first angle of rotation about a first axis and a second angle of rotation about a second axis, the first angle of rotation produced by the first motor and the second angle of rotation produced by the second motor. A step 4045 is to measure the first angle of rotation with the first angle measuring device and to measure a second angle of rotation with the second angle measuring device. A step 4050 is to reflect a portion of the first beam from the retroreflector target as a second beam. A step 4055 is to measure a first distance from the coordinate measurement device to the retroreflector target with the distance meter, the measured distance based at least in part on a third portion of the second beam of light received by a first optical detector. A step 4060 is to determine three-dimensional coordinates of the retroreflector target based at least in part on the first distance, the first angle of rotation, and the second angle of rotation. A step 4065 is to store the determined three-dimensional coordinates.

FIG. 19 shows a method 4110 for measuring three-dimensional coordinates of a retroreflector target. A step 4115 is to provide a position detector assembly, the position detector assembly including a position detector. A step 4120 is to send a fourth portion of the second beam onto the position detector. A step 4125, which follows from the step A of FIG. 18, is to obtain a first signal from the position detector, the first signal responsive to the position of the fourth portion on the position detector. A step 4130 is to send a second signal to the first motor and sending a third signal to the second motor, the second signal and the third signal based at least in part on the first signal. A step 4135 is to adjust the first direction of the first beam to the position in space of the retroreflector target. The procedure terminates at step B.

In an embodiment, light of multiple wavelengths is sent out of the tracker collimated, which is to say that the rays of light exiting the tracker are nearly parallel. In some cases, if light of different wavelengths pass through different lens elements before being combined, these lens elements may be selected to provide the desired collimation. However, for the case shown in FIGS. 15 and 16 in which light of two different wavelengths emerge from a single fiber-optic exit point 1782, the configuration in FIGS. 4A, 4B, and 5 cannot provide perfect collimation if the lenses shown in the figures represent single lens elements. For example, if the lenses 141A and 142A are singlets (single lens elements) and if the incoming light 220A is collimated, then the beam expander 140A can provide perfectly collimated light 230A at only one wavelength. In FIG. 4B, if the lenses 141B and 142B in beam expander 140B are singlet lenses and if the incoming light 220B is collimated, then perfect collimation of the output beam 230B can be provided at only one wavelength. In FIG. 5, if the beam launch 170 includes a singlet positive lens 176 and if the light is launched fiber ferrule 174, then perfect collimation of the emitted light 252 is only possible for a single wavelength of the light 250.

This limitation is particularly problematic when a fiber coupler 1750 in FIG. 16 is used to combine two different wavelengths. By combining two beams of light in optical fiber, good alignment of the different wavelengths of light is assured, but simple launch arrangements such as FIG. 5 cannot produce light collimated at both wavelengths if the lens 176 is a singlet.

Figure 20A:
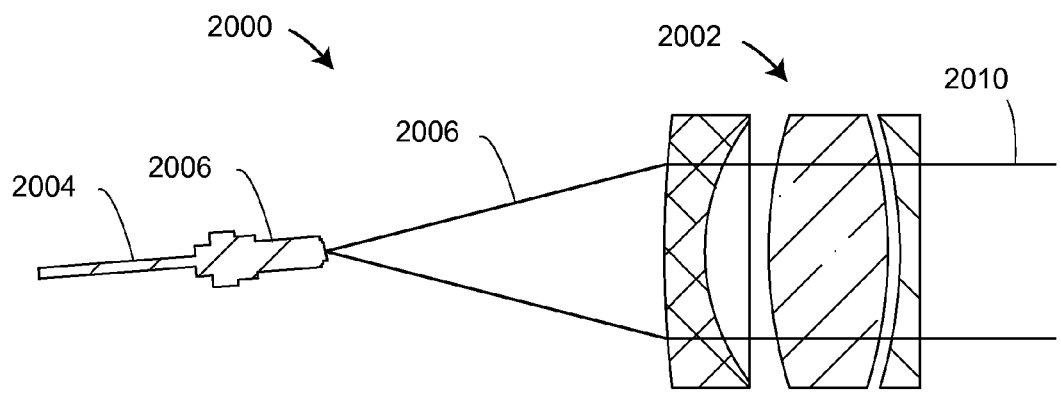
FIGS. 20A, 20B, and 20C are schematic illustrations of three lens architectures configured for collimating light of several wavelengths according to an embodiment.

A way to get around this limitation is described in reference to FIG. 20A, in which the fiber launch 170 of FIG. 5 is replaced by a multi-element achromatic lens assembly 2002. Achromatic lens are made by combining two or more lens elements, each lens element made of a different glass, each of the different glasses having different index of refraction and a different dispersion, the dispersion being related to a rate of change in the index of refraction with wavelength.

Another purpose for using two or more lens elements in the lens assembly 2002 is to reduce aberrations. This is done by selecting particular glasses, curvatures, and thicknesses to minimize aberrations as well as to provide good collimation at two desired wavelengths.

Figure 20B:
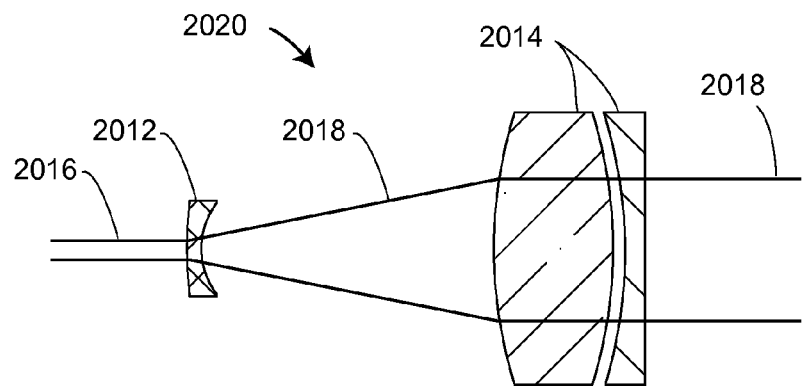
Figure 20C:
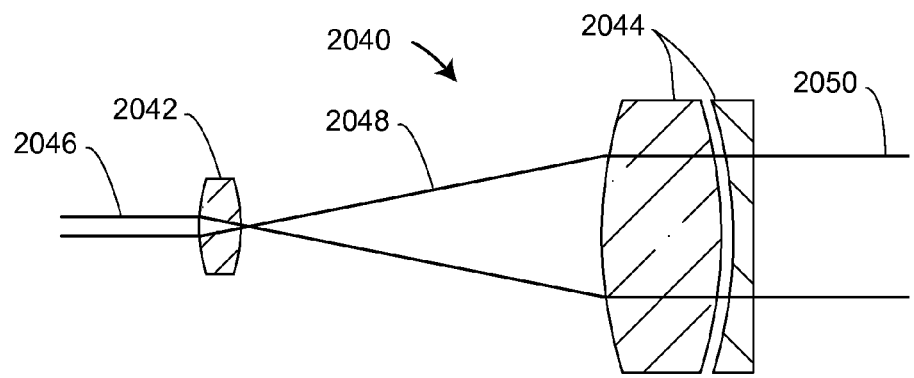

A doublet of two lens elements 2014 in FIG. 20B or 2044 in FIG. 20C may be used to make the beam expander achromatic. Other lens arrangements of three or more lens elements may be used in beam expanders 2020 and 2040 to provide collimated light 2018 and 2050, respectively. Achromatic beam expanders 2020 or 2040 may be used in combination with an achromatic fiber launch 2000 if desired. Achromatic beam expanders 2020 or 2040 may also provide collimation of multiple wavelengths using free-space combining optics such as beam splitters.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A coordinate measurement device configured to send a first beam of light to a target point, the target point having a position in space, the target point returning a portion of the first beam as a second beam, the measurement device comprising:
    a first light source configured to emit a first light having a first wavelength;
    a second light source configured to emit a second light having a second wavelength, the second wavelength different than the first wavelength;
    a fiber-optic coupler that includes at least a first port, a second port, and a third port, the first port configured to accept a first portion of the first light, the second port configured to accept a second portion of the second light, the third port configured to transmit a third light, the third light including a portion of the first portion and a portion of the second portion;
    an optical system configured to transmit a portion of the third light out of the coordinate measurement device as the first beam, the optical system including an achromatic optical element configured to collimate the first beam at the first wavelength and the second wavelength;
    a first motor and a second motor that together are configured to direct the first beam of light to a first direction, the first direction determined by a first angle of rotation about a first axis and a second angle of rotation about a second axis, the first angle of rotation produced by the first motor and the second angle of rotation produced by the second motor;
    a first angle measuring device configured to measure the first angle of rotation and a second angle measuring device configured to measure the second angle of rotation;
    a distance meter configured to measure a first distance from the coordinate measurement device to the target point based at least in part on a third portion of the second beam received by a first optical detector; and
    a processor configured to provide three-dimensional coordinates of the target point, the three-dimensional coordinates based at least in part on the first distance, the first angle of rotation, and the second angle of rotation.

2. The coordinate measurement device of claim 1, further comprising:
    a position detector assembly that includes a position detector, a fourth portion of the second beam passing onto the position detector, the position detector configured to produce a first signal in response to a position of the fourth portion on the position detector; and
    a control system configured to send a second signal to the first motor and a third signal to the second motor, the second signal and the third signal based at least in part on the first signal, the control system configured to adjust the first direction of the first beam to the position in space of the target point.

3. The coordinate measurement device of claim 1, wherein the distance meter is an absolute distance meter.

4. The coordinate measurement device of claim 1, wherein the optical system is further configured to couple the third portion of the second beam into the third port of the fiber-optic coupler.

5. The coordinate measurement device of claim 1, wherein the fiber-optic coupler further includes a fourth port.

6. The coordinate measurement device of claim 5, wherein the fourth port is attached to a low-reflection termination.

7. The coordinate measurement device of claim 1, wherein the first wavelength is between 780 nm and 850 nm.

8. The coordinate measurement device of claim 1, wherein the second wavelength is a red wavelength or a green wavelength.

9. The coordinate measurement device of claim 1, wherein the first wavelength is an infrared wavelength and the second wavelength is a visible wavelength.

10. The coordinate measurement device of claim 1, wherein the first wavelength is a visible wavelength and the second wavelength is an infrared wavelength.

11. The coordinate measurement device of claim 1, wherein the first wavelength is a visible wavelength and the second wavelength is a visible wavelength.

12. A method for measuring three-dimensional coordinates of a target point located at a position in space, the method comprising steps of:
providing a coordinate measurement device that includes a first light source that produces a first light at a first wavelength, a second light source that produces a second light at a second wavelength different than the first wavelength, a fiber-optic coupler that includes at least a first port, a second port, and a third port, an optical system that includes an optical element achromatic at the first wavelength and the second wavelength, a first motor, a second motor, a first angle measuring device, a second angle measuring device, a distance meter, and a processor;
coupling a first portion of the first light into the first port;
coupling a second portion of the second light into the second port;
transmitting a third light from the third port, the third light containing a portion of the first portion and a portion of the second portion;
transmitting a portion of the third light through the optical system out of the coordinate measurement device as a first beam of light collimated at the first wavelength and the second wavelength;
directing the first beam of light in a first direction, the first direction determined by a first angle of rotation about a first axis and a second angle of rotation about a second axis, the first angle of rotation produced by the first motor and the second angle of rotation produced by the second motor;
measuring the first angle of rotation with the first angle measuring device;
measuring the second angle of rotation with the second angle measuring device;
reflecting a portion of the first beam from the target point as a second beam;
measuring a first distance from the coordinate measurement device to the target point with the distance meter, the measured distance based at least in part on a third portion of the second beam of light received by a first optical detector;
determining three-dimensional coordinates of the target point based at least in part on the first distance, the first angle of rotation, and the second angle of rotation; and
storing the determined three-dimensional coordinates.

13. The method of claim 12, further comprising steps of:
providing a position detector assembly, the position detector assembly including a position detector;
sending a fourth portion of the second beam onto the position detector;
obtaining a first signal from the position detector, the first signal responsive to the position of the fourth portion on the position detector;
sending a second signal to the first motor and sending a third signal to the second motor, the second signal and the third signal based at least in part on the first signal; and
adjusting the first direction of the first beam to the position in space of the target point.

14. The method of claim 12, wherein the step of providing a coordinate measurement device further includes providing the distance meter as an absolute distance meter.

15. The method of claim 12, wherein the step of measuring a first distance from the coordinate measurement device to the target point with the distance meter further includes a step of coupling the third portion of the second beam into the third port of the fiber-optic coupler.

16. The method of claim 12, wherein the step of providing a coordinate measurement device further includes providing the fiber-optic coupler with a fourth port.

17. The method of claim 16, wherein the step of providing a coordinate measurement device further includes providing the fiber-optic coupler with the fourth port attached to a low-reflection termination.

* * * * *